/ 12) United States Patent
Veitsel et al.

(10) Patent No.: US 11,782,168 B2
(45) Date of Patent: *Oct. 10, 2023

(54) METHOD AND APPARATUS FOR RECEIVING CHIP-BY-CHIP MULTIPLEXED CSK SIGNALS

(71) Applicant: Topcon Positioning Systems, Inc., Livermore, CA (US)

(72) Inventors: Andrey Vladimirovich Veitsel, Moscow (RU); Leonid Victorovich Purto, Moscow (RU); Dmitry Anatolyevich Rubtsov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,503

(22) Filed: Feb. 14, 2023

(65) Prior Publication Data

US 2023/0194730 A1 Jun. 22, 2023

Related U.S. Application Data

(63) Continuation of application No. 17/282,398, filed as application No. PCT/RU2020/000186 on Apr. 22, 2020, now Pat. No. 11,604,285.

(51) Int. Cl.
*G01S 19/30* (2010.01)
*G01S 19/24* (2010.01)
(Continued)

(52) U.S. Cl.
CPC ............ *G01S 19/30* (2013.01); *G01S 19/243* (2013.01); *G01S 19/37* (2013.01); *H04B 1/709* (2013.01)

(58) Field of Classification Search
None
See application file for complete search history.

(56) References Cited

U.S. PATENT DOCUMENTS 10,715,207 B2 7/2020 Brown
10,742,257 B1 8/2020 Fenton et al.
(Continued)

FOREIGN PATENT DOCUMENTS

| AU | 2013294159 A1 | 9/2017 |
| JP | 5146471 B2 | 2/2013 |
| WO | 2018093283 A1 | 5/2018 |

OTHER PUBLICATIONS

Search Report in PCT/RU2020/000186, dated Jun. 11, 2021.
(Continued)

*Primary Examiner* — Gregory C. Issing
(74) *Attorney, Agent, or Firm* — Bardmesser Law Group

(57) ABSTRACT

A method of receiving two chip-by-chip multiplexed CSK signals (e.g., GNSS signals) and searching for a non-CSK signal with optimal performance at a given digit capacity of a sampling memory resided in parallel correlators. For CSK signals Prompt, Early and Late results for each of possible code shift are calculated as different sums of four punctured convolutions. Depending on configuration, the method allows to receive both multiplexed CSK signals with lesser quality or one of the CSK signals with better quality. The method can be implemented as an apparatus with four punctured correlators, a set of multipliers by 1 or $2^N$, another set of multipliers by 1 or 0, summers of four input to one result, a RAM, searchers of maximum, and conditional commutators.

19 Claims, 16 Drawing Sheets

(51) Int. Cl.
  *G01S 19/37*    (2010.01)
  *H04B 1/709*    (2011.01)

(56) References Cited

U.S. PATENT DOCUMENTS

| | | |
|---|---|---|
| 10,742,258 B1 | 8/2020 | Brown |
| 2015/0015439 A1 | 1/2015 | Veitsel et al. |
| 2016/0116599 A1 | 4/2016 | Turner |
| 2018/0239026 A1 | 8/2018 | Veitsel et al. |
| 2019/0041530 A1 | 2/2019 | Veitsel et al. |
| 2020/0136672 A1 | 4/2020 | Fenton |

OTHER PUBLICATIONS

Written opinion in PCT/RU2020/000186, dated Jun. 24, 2021.

Garcia Pena, et al., "Investigation of CSK as a Candidate for Future GNSS Signals." EWGNSS 2013, 6th European Workshop on GNSS Signals and Signal Processing, Dec. 2013, Munich, Germany. (2013).

Garcia Pena, et al., "Analysis of the use of CSK for Future GNSS Signals." ION GNSS 2013, 26th International Technical Meeting ofThe Satellite Division of the Institute of Navigation, Sep. 2013, Nashville, United States. ION, pp. 1461-1479, 2013. (2013).

Garcia Pena, et al., "Code Shift Keying: Prospects for Improving GNSS Signal Designs." Inside GNSS, 2015, 10 (6), pp. 52-62. (2015).

METHOD AND APPARATUS FOR RECEIVING CHIP-BY-CHIP MULTIPLEXED CSK SIGNALS

FIELD OF THE INVENTION

The invention relates to receiving and processing Code Shift Keying (CSK) signals in a GNSS receiver.

BACKGROUND OF THE RELATED ART

Progress in satellite navigation is based on capabilities of receiving signals in ever-increasing numbers of frequency bands, with the signals requiring more and more sophisticated and complex processing of signals, including those modulated by Code Shift Keying (CSK) [1]. The main advantage of such signals is their superior noise immunity or spectral efficiency at the same noise. However, demodulation of CSK signals is much more complicated than that of phase-manipulated symbols and in general requires construction of a full value correlation function in the range of all possible PRN offsets for each coming symbol. Reception of CSK signals is even more sophisticated (and thus, expensive), if one radio signal comprises two chip-by-chip multiplexed CSK signals, where neither signal is a pilot signal different from CSK-type. In this case, the CSK signals are fed both to a data demodulation logic and to a clock adjustment logic (also known in literature as a "Time Recovery System"). The second logic is also known as a range tracking or delay lock loop (DLL) logic. As result, discriminator outputting range-tracking errors needs a more detailed correlation function, including additional positions (range delays) not corresponding to possible offsets of the pseudo-random code in CSK symbols.

Reference [2] discloses an apparatus capable of calculating a correlation function to receive CSK signals using a set of correlators, each of which calculates a convolution of the received signal and a reference signal formed as a reference code sequence (also called "replica") shifted in a certain, different for each correlator, value. A drawback of this apparatus is a large number of correlators, each of which stores or generates the reference signal.

Reference [5] discloses a method and devices on its basis for tracking code positions (also called as "phase code"), that utilizes additional correlators adjusted with the forward and backward-shifted code positions ("Early correlator" and "Late correlator", respectively), the positions being shifted in the value less than the chip duration. Implementation of such a method to demodulate and track chip-by-chip multiplexed CSK signals with M bits for each symbol requires calculations of $3*2^M$ points of the correlation function for receiving each symbol for each of two multiplexed signals. A simultaneous reception of both signals means doubling the determined values of correlation functions. Thus, if the number of bits per symbol in each multiplexed signal is M=8, then one needs $3*2^8=768$ correlators to receive one multiplexed signal, and 1536 channels for both signals, but this number is comparable to or exceeds the total correlator number for receiving all other satellite navigation signals.

Reference [7] discloses a method of adjusting clocks wherein in one embodiment tracking error is determined using correlations of the reference signal with the input signal delayed and advanced the reference signal in time by one elementary symbol or (when the spectrum is directly spread by code) by one chip. This method is intensively used in communications systems. It is the same as Early and Late correlators shifted by the whole chip forward or backward relative to the Prompt position. When a non-multiplexed CSK signal is received, this method allows one to omit calculations of the correlation function in positions not matching a possible value of the symbol. In reception of chip-by-chip multiplexed CSK signals, this method only partly reduces the number of correlators. This is because forward and backward shifts of one of multiplexed codes relative to predicted Prompt shift of this code do not correspond to another possible Prompt shift of this code, but correspond to possible Prompt shifts of the other multiplexed code. As a result, to demodulate and track delays of chip-by-chip multiplexed CSK signals with M bits per symbols, $2*2^M+1$ points of the correlation function need to be calculated in the process of receiving each symbol of each of two multiplexed signals. Similarly to reference [5], the simultaneous reception of both signals doubles the number of the determined points in the correlation functions. For the example above, the number of correlators for each multiplexed signal with M=8 bits for each symbol is $2*2^8+1=513$ correlators, and 1026 channels for both signals, which is fewer than in the above method [5], but still far too many. It should be noted that this method increases noise errors of the Early-Late correlator.

An apparatus known as "sliding" or "parallel" correlator, see reference [3], is known; it calculates correlation function between the received signal and reference signal using a block of accumulators updated by one calculation module. In addition to accumulators, such an apparatus includes memory elements (e.g., flip flops) designed to store the input signal and reference signal. These memory blocks (e.g., shift registers formed of the flip flops) have a great number of outputs equal to the number of simultaneously produced multiplications and subtractions. A typical approach here is an implementation of such memory blocks as a tapped delay line. Having memory block storing the input signal, and having a great number of computational operations at a speed higher than the chip rate of the input signal, this apparatus stores only one replica, uses only one computation module and hence can be implemented in a cheaper way rather than an equivalent set of single universal correlators.

Reference [4] discloses an embodiment of a correlator wherein its output is calculated as convolution of single-digit samples of the input signal and single-digit replicas of the code sequence. The advantage of this is additional hardware savings due to using operations like XOR instead multi-digit multipliers. Together with reference [3] above, this construction can implement the more efficient method of calculating correlation functions. Another advantage of this method is that the memory block where the input signal is stored becomes as small as possible. Since each memory element is of one bit size, the total bit quantity (hereafter $L_{bits}$) needed to store W samples is W, i.e., $L_{bits}$=W. A drawback of this is a worse noise immunity, approximately by 2 dB. However, loss of 2 dB in reception of CSK signals practically nullifies benefits from this modulation and makes impossible for the receiver to receive navigation corrections, if signal reception conditions are unfavorable. At the same time, the apparatus disclosed in reference [4] with single-digit representation of the input signal and code sequence can be considered optimal for searching for navigation satellite signals different from CSK signals. This is true even notwithstanding the loss of energetics, if the optimal criterion is formulated as the best sensitivity at certain total number of bits in an apparatus that are allocated for storing the input signal. The fixed total bit quantity $L_{bits}$ means that if each signal sample is stored using more than one bit (hereafter $S_{bits}$), then, the number of simultaneously stored samples W is correspondingly reduced relative to single bit representation, and therefore the number of parallel correlators is reduced as well. It results in a slower rate of search of positions, frequencies and other parameters of the processed signal. The relationship between W, $L_{bits}$ and $S_{bits}$ is obviously expressed as: $L_{bits}=W*S_{bits}$. Thus, the receiver sensitivity, assuming a given Time To First Fix (TTFF), worsens despite a reduction in correlator loss.

Reference [6] discloses a method and system for demodulating and tracking of CSK signals, according to whose calculation of the correlation characteristic of the received signal is more qualitatively implemented at code offsets corresponding to one of possible symbol values, whereas calculation of the correlation characteristic at Early and Late positions is implemented in a less qualitative manner and not for all needed positions. According to some embodiments of the method, the Early and Late correlators are not part of a parallel correlator. The main advantage of this method is its smaller hardware cost and complexity (in terms of, for example, integrated circuit area) at the certain reception quality of CSK signal, compared to other methods considered above. However, in some cases, due to ionosphere and troposphere effects, the quality of tracking CSK signals can be worse. The worsening happens because the DLL quality becomes poor and requires an assistance from a similar loop tracking of other signals of the same satellite but in a different frequency band. As a result, it may cause a worsening of data demodulation.

From the above it follows that at a given digit capacity of samples $S_{bits}$ in a parallel correlator, either non-CSK signal searching or CSK signal receiving (where receiving means demodulation and tracking) will be implemented in a non-optimal manner. A universal module with given $S_{bits}$ capable of operating in both searching for a non-CSK signal and receiving two chip-by-chip multiplexed CSK signals modes, at some assigned quality, will be more expensive than a non-universal module of the same quality, and same fixed memory capacity $L_{bits}$, which supports only one of the two modes. It should be noted that known methods of receiving CSK signals in the form of a parallel correlator do not allow Early-Late correlator to be implemented in a more economical way than Prompt correlators, whereas implementation of some such correlators in a form different from parallel correlators worsens related DLL operation and can result in deteriorating reception. These drawbacks can be partly eliminated if the navigation receiver comprises two non-universal apparatuses [3]: one with multi-digit sample presentation to receive CSK signals, and the other similar to [4]—with single-digit sample presentation to search for navigation signals. However, such a technical solution will be more optimal if both apparatuses operate at the same time, i.e., searching for non-CSK signals and receiving the CSK signals is performed at the same time. In practice, there is no need for simultaneous searching for navigation signals and receiving a correction data transmitted in CSK signals. In typical scenarios, the receiver first searches for navigation signals, then this search terminates, and calculation and output of positions starts. Then, the reception of correction data carrying in CSK signals becomes relevant. At such an operation mode, availability of two sophisticated devices in the receiver, which are not assumed to be used simultaneously, cannot be regarded as optimal solution, since a receiver comprising one universal apparatus [3] instead of two non-universal ones is less expensive at the same quality.

SUMMARY OF THE INVENTION

The present invention relates to receiving and processing Code Shift Keying signals in a GNSS receiver that substantially obviates one or several of the disadvantages of the related art.

In one aspect of the invention, a method of receiving two chip-by-chip multiplexed CSK signals, including, for a CSK symbol, obtaining a first quadrature and a second quadrature of a moved-to-zero-frequency signal, and integrating both quadratures over a chip duration interval divided by K, where K=1 or 2; normalizing and rounding the integrated quadratures in each quadrature up to a nearest number in an arithmetic progression $\{-2*2^D+1, -2*2^D+3, \ldots, -1, +1, \ldots, +2*2^D-3, +2*2^D-1\}$, where D is an integer>0; representing the rounded quadratures as $\Sigma_{j=0}^{D} 2^j * x_j$, where $x_j = +/-1$; shifting $x_j$ calculated for the first quadrature through a first delay line, and $x_j$ calculated for the second quadrature in a second delay line, $x_j$ becomes first element of the delay line, wherein when K=1, the shifting is done after each integration, when K=2, the shifting is done after each of two consecutive integrations, and no shifting is done after two alternate consecutive integrations; calculating four convolutions of each delay line with a reference signal, each convolution multiplying each fourth element from the delay line and the reference signal, where each element from the delay line is used in only one of four convolutions; using the four convolutions to calculate a predicted Prompt, a predicted Early, and a predicted Late; inserting the Prompt into a set of predicted Prompts, inserting the Early into a set of predicted Earlies, and inserting the Late into a set of predicted Lates; and demodulating the CSK symbol using the set of predicted Prompts to demodulate the CSK symbol and adjusting a start time of the chip duration interval for the next CSK symbol reception based on the sets of the Earlies, Prompts and Lates.

calculate the predicted Prompt, Early and Late, the four convolutions are multiplied by $2^j$, wherein j for each convolution is the index j of $x_j$ that were shifted to a fourth element of the delay line; and the four convolutions are multiplied by a pre-set weight 0 or 1 for each convolution from a first set of weights and then summed to obtain the predicted Prompt, the four convolutions are multiplied by a pre-set weight 0 or 1 from a second set of weights, then summed to obtain the predicted Early, the four convolutions are multiplied by pre-set weight 0 or 1 from a third set of weights, then summed to obtain the predicted Late.

Optionally, the calculating of the four convolutions is based on a rule: a convolution with number P (P=1, 2, 3, 4) is equal to the sum of multiplication products of each fourth element of the delay line by each fourth element of the reference signal, where the first convolution element of the delay line and of the reference signal being elements with index P, wherein element with index P=1 is the first element in the delay line.

Optionally, the method includes repeating the steps for subsequent CSK symbols. Optionally, D is different for different integration intervals. Optionally, at K=1, D for successive integration intervals alternatively changes according to: a first interval with D=2, a second interval with D=0, a third interval with D=2, a fourth interval with D=0 and so on, and wherein the normalizing and rounding of the integrated quadratures is done for intervals with D=2 to a nearest number from a set $\{-7, -5, -3, -1, +1, +3, +5, +7\}$, and the normalizing and rounding of the integrated quadratures for intervals with D=0 is done to a nearest number from a set $\{-1, +1\}$.

Optionally, in the first set of weights, three weights are equal to 1, weights with value 1 correspond to convolutions with elements of delay lines $x_j$, calculated at D=2, the second and third sets of weights are identical and include one weight with value 1 corresponding to a convolution with zero-weight in the first set of weights.

Optionally, D=1 for all integration intervals and the normalizing and rounding of the integrated quadratures is done to a nearest number from a set $\{-3, -1, +1, +3\}$. Optionally, D=1 and K=2, the first set of weights includes four values 1, the second set of weights includes two values 1 and two values 0, the third set of weights contains two values 1 at positions where the second set of weights had 0, and two values 0 at positions where the second set of weights had 1.

Optionally, at K=1 the first, second and third sets of weights are identical and contain two values 0 and two values 1, wherein the four convolutions for each quadrature are also multiplied by a pre-set weight 0 or 1 of a fourth set of weights, the fourth set of weights containing two values 1 at positions where the first set of weights has 0, and two values 0 at positions of two values 1 of the first set of weights. Optionally, a code shift for the CSK symbol is determined based on either a maximum of (1) a sum of quadrature squares from the set of predicted Prompts or (2) a maximum of amplitude of a complex value formed as the first quadrature+i*second quadrature, or (3) a maximum of one quadrature of the set of predicted Prompts, taking the most positive value.

Optionally, one value of the set of predicted Earlies and one value of the set of predicted Lates is selected according to the received CSK symbol value, then an Early-Late difference is calculated and a time of beginning of the integration interval is specified based on the Early-Late difference. The beginning of the integration interval is also referred to as to a delay of first chips of incoming CSK-symbols, where a control system that performs adjustment of the delay based on the Early-Late difference is referred to as to Delay Locked Loop (DLL).

Optionally, for the first chip-by-chip multiplexed CSK signal, a symbol value and a symbol beginning time are evaluated using a set of predicted Prompts, Earlies and Lates obtained with the first, second and third sets of weights, and for the second chip-by-chip multiplexed CSK signal, a transmitted symbol value and a symbol beginning time are evaluated using the set of predicted Prompts, Earlies and Lates obtained with the fourth weight set.

Optionally, the reference signal is a sequence of +1's and −1's. Optionally, the reference signal represents the first chip-by-chip multiplexed CSK signal, each chip of the first chip-by-chip multiplexed CSK signal is represented as four equal consecutive elements. Optionally, the reference signal represents both the first and the second chip-by-chip multiplexed CSK signals, each chip of each multiplexed CSK signal is represented as two equal consecutive elements. Optionally, elements in delay lines of each quadrature, as well as the reference signal, are coded by one bit that represents the sign of the coded value.

In another aspect, an apparatus to receive a CSK signal includes a PRN code generator; an L-bit shift register receiving an output of the PRN code generator; a non-shifted register C receiving a copy of the bits in the L-bit shift register; a first shift register R1 and a second shift registers R2 of L-bit shift register storing first and second quadratures of the CSK signal; a mixer shifting the CSK signal to zero-frequency and outputting the first and second quadratures to first and second accumulators; the first and second accumulators integrating the first and second quadratures; first and second re-quantizers that reduce a number of bits used to represent the first and second quadratures from the first and second accumulators; first and second converters that convert the reduced-bit representation the first and second re-quantizers into a serial format, and whose output is provided to the registers R1 and R2, respectively; four correlators, each correlator receiving outputs of the registers R1 and R2, and outputting a correlation of the outputs of the register R1 and the register C as the first quadrature, and a correlation of the output of the register R2 and the register C as the second quadrature, wherein bits in the registers R1, R2 and C are interpreted as either −1 or +1, wherein each correlator uses every corresponding fourth bit in the registers R1, R2 and C for its correlation; four quadrature multipliers that multiply the first and second quadratures by multiplicators $2^N$, N being non-negative integers individually configurable for each multiplier; twelve quadrature multipliers (i.e., three groups of four) that multiply the first and second quadratures by multiplicators 0 or 1, individually configurable for each multiplier; each of the four correlators providing an input to corresponding quadrature multipliers of the four quadrature multipliers; outputs of the four quadrature multipliers are provided to corresponding groups of four quadrature multipliers in the twelve quadrature multipliers; at least three quadrature summers, each of the summers receiving inputs from a corresponding group of the three groups and providing a sum of the corresponding input from the particular group of four quadrature multipliers; a first commutator connected to the at least three quadrature summers and selecting one of the three summers; a random access memory (RAM) storing a plurality of correlation results such that an output of the first commutator is added to the first and second quadratures of one correlation result in the RAM, the first and second quadratures are replaced by a result of the addition, and the result of the addition is outputted; first, second and third searchers, where each searcher finds a maximum of the first and second quadratures, wherein (1) the first quadrature or (2) a sum of squares of the first and second quadratures or (3) an amplitude of the first quadrature plus i*second quadrature being checked for a maximum, wherein the maximum in the first searcher corresponds to the quadratures and a code shift of a received symbol of a first chip-by-chip multiplexed CSK signal in a Prompt position, the maxima in the second and the third searchers correspond to quadratures of the received symbol in Early and Late positions to be fed to a CSK signal Delay Locked Loop (DLL).

Optionally, the apparatus includes three 4-bit shift registers with function of rotating to the right that configure the four quadrature multipliers and the twelve quadrature multipliers, where each bit of the first register is connected to a configuration input of one of the four quadrature multipliers, each bit of the second shift register is respectively connected to a configuration input of quadrature multipliers in the first group of four from twelve quadrature multipliers, each bit of the third register is respectively connected to a configuration input of a second four of the quadrature multipliers in the twelve quadrature multipliers and connected being grouped in the second group, and via an inverter, to a configuration input of a third four of the quadrature multipliers in the twelve quadrature multipliers, being grouped in the third group, wherein the shift registers perform a shift in a direction from most significant bit (MSB) to least significant bit (LSB), and wherein the shifted out LSB is carried to the MSB. Optionally, the second and the third 4-bit shift registers are initialized in accordance with the first and second sets of weights. Optionally, the first 4-bit register is initialized in a rule that is also used to form representation of the rounded quadratures as $\Sigma_{j=0}{}^D 2^{j*} x_j$ Optionally, inputs of the searchers are connected to the output of the RAM through a second commutator, the first and second commutators having a control input to select a commutation rule, each searcher receiving each component of the first and second quadratures via separate inputs, wherein the second commutator conditionally replaces or delays some components of the correlator results being output by the RAM.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF EMBODIMENTS OF THE INVENTION

Figure 1:
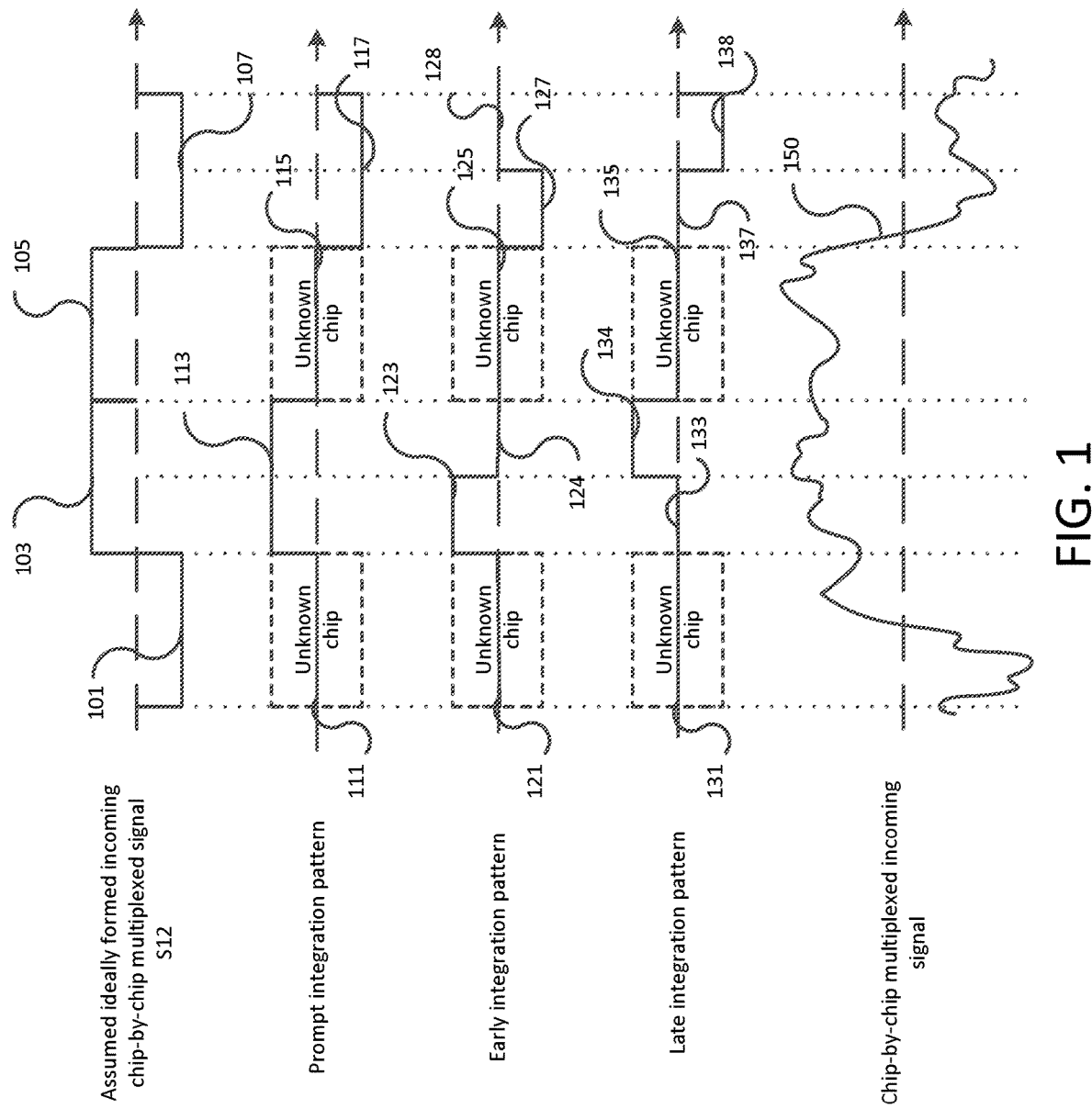
FIG. 1 illustrates a structure of an equivalent reference signal for a simple correlation for embodiment A of the invention.

Reference will now be made in detail to the preferred embodiments of the present invention, examples of which are illustrated in the accompanying drawings.

The proposed method of receiving two chip-by-chip multiplexed CSK signals S1 and S2 combined into a single signal S12 is implemented such that the user could operate both with CSK signals in a data reception mode (the main solved task) and with satellite navigation signals of non-CSK type in searching mode, keeping most optimal efficiency of equipment costs and quality. To do this, input signal samples are convoluted together with reference signal as follows:

input signal S12 is moved to zero-frequency in form of two quadrature signals (referred in literature to as I and Q—in phase and quadrature); the signal is integrated in each quadrature over the interval equal to full or half chip duration, after that the result is normalized and rounded off to a short-digit number.

the bits of the obtained rounded value of the corresponding quadrature are successively moved in the delay line of L bits long for each of the two quadrature of the complex input signal.

a result of four convolutions (or, more generally, Z convolutions, Z being an integer power of 2 and not less than 4) is computed, each convolution being a sum of one-bit additions (equivalent to operation XOR), according to the following rule:

$$\begin{cases} I_1 = C1 + \sum_{i=1}^{L} (a_i XOR\, c_i) \text{ for all } i \text{ that meet}: i\, MOD\, 4 = 1 \\ I_2 = C2 + \sum_{i=1}^{L} (a_i XOR\, c_i) \text{ for all } i \text{ that meet}: i\, MOD\, 4 = 2 \\ I_3 = C3 + \sum_{i=1}^{L} (a_i XOR\, c_i) \text{ for all } i \text{ that meet}: i\, MOD\, 4 = 3 \\ I_4 = C4 + \sum_{i=1}^{L} (a_i XOR\, c_i) \text{ for all } i \text{ that meet}: i\, MOD\, 4 = 0 \end{cases} \quad (1)$$

and $$\begin{cases} Q_1 = C1 + \sum_{i=1}^{L} (b_i XOR\, c_i) \text{ for all } i \text{ that meet}: i\, MOD\, 4 = 1 \\ Q_2 = C2 + \sum_{i=1}^{L} (b_i XOR\, c_i) \text{ for all } i \text{ that meet}: i\, MOD\, 4 = 2 \\ Q_3 = C3 + \sum_{i=1}^{L} (b_i XOR\, c_i) \text{ for all } i \text{ that meet}: i\, MOD\, 4 = 3 \\ Q_4 = C4 + \sum_{i=1}^{L} (b_i XOR\, c_i) \text{ for all } i \text{ that meet}: i\, MOD\, 4 = 0 \end{cases} \quad (2)$$

where $a_i$ and $b_i$ are the one-bit elements in delay-lines of the first and second quadratures, $c_i$ is the one-bit element of the reference signal, $I_1$, $I_2$, $I_3$, $I_4$ are the results of four convolutions for the first quadrature, $Q_1$, $Q_2$, $Q_3$, $Q_4$ are the results of four convolutions for the second quadrature, i MOD 4 means the remainder of division of i by 4, C1, C2, C3, C4 are the constants compensating for the difference between the average value at the output of a full multiplier of values plus/minus one at its input and the average value at the output of XOR element obtaining 0 instead of +1 at its input.

Each delay line can be considered as an array of elements with indexes 1–L. The bits of the obtained rounded value when moved are placed into an element with index 1, simultaneously the element with index 1 being moved to element with index 2 and so on.

These operations and operations that processed the results unless stipulated are performed for each CSK symbol.

A chip hereafter is one bit of reference PRN-code, a duration of transmitting chips or half chips is the time to transmit one bit of PRN code or respectively half this time, an element of the input signal is the number corresponding to a possible value of the reference signal at the definite time moment or one of PRN-code bits which is the same thing.

The sum $I^{std}{}_{1\_4} = I_1 + I_2 + I_3 + I_4$ is obviously equivalent to one complete convolution of all $a_i$ and $c_i$. At one-bit quantization of the integrated on zero-frequency signal, $I^{std}{}_{1\_4}$ at the corresponding $c_i$ is equal to the convolution of the first quadrature of the input signal with the reference signal over the interval of W chips or half chips.

However, as noted above, according to the concept described herein, many bits of the multi-bit results of signal integrating, rather than one-bit values, are successively moved in the delay line of each quadrature. The results are moved every time or partially over chip or half chip interval, each bit from a multi-bit result being moved in separate move operation. According to the present invention, the results of four convolutions of each quadrature are added as follows:

$$\begin{cases} I_{1\_4}^p = z_1^p * m_1 * I_1 + z_2^p * m_2 * I_2 + z_3^p * m_3 * I_3 + z_4^p * m_4 * I_4 \\ Q_{1\_4}^p = z_1^p * m_1 * Q_1 + z_2^p * m_2 * Q_2 + z_3^p * m_3 * Q_3 + z_4^p * m_4 * Q_4 \end{cases} \quad (3)$$

where p is a token of one addition result, $z^p_1$, $z^p_2$, $z^p_3$, $z^p_4$ are four weights of a $Zero^p$ set with the token p where the weights take values 0 or 1, $m_1$, $m_2$, $m_3$, $m_4$ are the four weights taking value $2^d$, d is the nonnegative integer.

In some embodiments, results at p=1, i.e., $I^1_{1\_4}$ or $Q^1_{1\_4}$, are used further as full or partial results of possible Prompt values, i.e., obtained on the offset assuming that the result of the given convolution corresponds to a possible code offset in the received CSK symbol of one of chip-by-chip multiplexed signals (hereafter, S1 signal). At p=2 the results correspond to possible Early value at the given Prompt, and the results at p=3 correspond to possible Late value at the given Prompt.

In some other embodiments results at p=1 and p=2 are identical, i.e., calculated using identical expressions. These results correspond to full or partial values of Prompt or Early for signal S1. A set of possible values for Prompt for the given symbol includes the results at p=1 that are obtained at a first specific time moments, and a set of possible Early values that include the results at p=2 that are obtained at some other time moments. The set of possible Early values is the set of possible Late values as well. It should be noted that in these and other embodiments of the invention the time moments and rules, according to which various actions are made or are not made, are unambiguously related to numbers of accumulation intervals.

In some embodiments, Early set is at the same time the set of possible Late values, results at p=1 correspond to full or partial Prompt value of signal S1, and results at p=2 correspond to full or partial Early values of signal S1, the results at p=1 obtained at the same time as the results at p=2, the results at p=2 are included in the set of possible Early values, the results at p=1 are included in the set of possible Prompt values for the given symbol.

In another embodiment, results at p=4, i.e., $I^4_{1\_4}$ and $Q^4_{1\_4}$ are used further as full or partial results of possible Prompt values of the second multiplexed signal (hereinafter—signal S2), i.e., obtained on assumption that the result of the given total convolution corresponds to a possible code offset in the received CSK symbol of the second chip-by-chip multiplexed signal. In some embodiments results at p=5 can be used as possible values of Early or Late for signal S2, the results at p=4 obtained at a first specific time moments being included in the set of possible Prompt values for the given symbol from S2, and the results at p=5 obtained at some other time moments being included in the set of possible Early or Late values for the given symbol from S2. The results at p=4 and p=5 are calculated based on the same expressions in these embodiments.

It is true for the embodiments above that the set of possible Early values is also the set of possible Late values, hence a set of weights $Zero^2$ in these embodiments is identical to a set of weights $Zero^3$.

Three primary embodiments from the embodiments above should be considered. In one embodiment (hereafter, this embodiment is referred to as to the "A embodiment"), one new value in the set of possible Prompt values (result at p=1), a new value in the set of possible Early values (result at p=2), one new value in the set of possible Late values (result at p=3) are calculated at some time moments according to the formula from $I_1$, $I_2$, $I_3$, $I_4$ and $Q_1$, $Q_2$, $Q_3$, $Q_4$. Note that these sets of possible Prompt, Early, and Late values are related to only one of two received multiplexed CSK signals, that is, either to signal S1 or—to S2, and weight sets $Zero^1$, $Zero^2$ and $Zero^3$ do not match. In another embodiment ("embodiment B") the calculated sets of possible Prompt, Early and Late values are also related to one of two received multiplexed CSK signals, the sets of possible Early and Late values being matched. Respectively, weight sets $Zero^2$ and $Zero^3$ match as well. Time moments at which the results at p=1 and p=2 are calculated are also match. But weight sets $Zero^1$ and $Zero^2$ do not match. In the third embodiment (hereafter embodiment C) at some time moments one new value in the set of possible Prompt values (result at p=1) for signal S1 and a new value in the set of possible Prompt values (result at p=4) for signal S2 are simultaneously calculated. At some other moments in time, one new value in the set of possible Early/Late values for the S1 signal (results at p=2) and for S2 signal (results at p=5) are calculated in a similar way. Weight set $Zero^1$ is identical to $Zero^2$, and $Zero^4$ is identical to the set $Zero^5$.

As described here, input signal S12 is moved to zero-frequency, integrated, re-quantized, and moved in the delay line as follows:

(1) The input signal is multiplied by carrier phase and thus one quadrature of the shifted to zero frequency signal is obtained, then the input signal is multiplied by 90 degrees-shifted carrier phase and thus the second quadrature of the shifted to zero frequency signal is obtained, after that the signal quadrature's are integrated over time interval equal to the chip duration divided by K, where K is equal to 1 or 2.

(2) After completion of the storing/accumulating interval, the result of each quadrature is normalized and rounded to the nearest value of the set representing an arithmetic progression in form $\{-2*2^D+1, -2*2^D+3, \ldots, -1, +1, \ldots, +2*2^D-3, +2*2^D-1\}$, where S is a positive integer, $S=2^D$, and D is a nonnegative integer.

(3) These results are presented in the form $\Sigma_{j=0}^{D} 2^j * x_j$, where $x_j$ is +1 or −1.

(4) $x_j$ calculated for the first quadrature is successively moved in the first delay line, and $x_j$ calculated for the second quadrature is successively moved in the second delay line, so that at K=1, all $x_j$ being moved in after each integration interval, and at K=2, the calculated $x_j$ being moved in after two of four integrations according to the rule: move in twice and then do not move in twice.

The arithmetic progression can also be expressed as $\{-2*2^D+1, -2*2^D+3, \ldots, -1, +1, \ldots, +2*2^D-3, +2*2^D-1\}$.

For some embodiments, K=2, D=1. This means that the signal that is moved to zero frequency is integrated in each quadrature over half chip interval, then it is normalized and rounded to the closest for the set $[-3, -1, +1, +3]$. Then, the chosen number is presented as a sum $2^0*x_0 + 2^1*x_1$ where $x_0=+1$ or =1, and $x_1=+1$ or −1. This operation is produced independently for each quadrature. Four one-bit numbers are obtained as a result. Then, the values $x_0$, after that, $x_1$ calculated for the first quadrature are moved in the delay line of the first quadrature. In some embodiments of the invention, $x_1$, after that, $x_0$ are inputted. Similarly, $x_0$ and then $x_1$ calculated for the second quadrature are inputted in the delay line of the second quadrature. When the first bit ($x_0$) has been already inputted, and the second bit ($x_1$) has not been inputted yet, $x_0$ becomes the first element in the delay line. According to describing convolutions given in expressions 1 and 2, this bit in the delay line of the first quadrature is named $a_i$, and in the second—$b_1$. After inputting the second bit ($x_1$), $x_0$ moves from $a_1$ in $a_2$ and from $b_1$ in $b_2$ respectively. In some embodiment, integration over a half chip interval is produced successively for all half chip intervals, but the results of re-quantization $x_0$ and $x_1$ are inputted only after the first and second of four integrations, and are not inputted after the third and fourth integrations. As a result, in the delay lines of each quadrature there will be placed decimalized samples with sampling rate twice as much as chip rate, but only those samples containing one of two multiplexed signals (for example, S1) and not containing the other one if time instant of beginning integration is correctly chosen.

Other embodiments of the invention can use the following constants in the calculations: K=1, D=1. It means that unlike the embodiment described above with K=2 and D=1, the signal S12 that is moved to zero-frequency is integrated in each quadrature over one chip interval, all the results being inputted in the delay line. Therefore, delay lines of each quadrature will include decimalized samples with sampling rate equal to chip rate and rounded to one of four levels. One of two samples at the correctly chosen time instant of beginning integration will comprise the first multiplexed signal, and the other—second signal.

In one more embodiment of the invention the calculations are produced at the following constants: K=1, D alternatively equal to 2 or 0. This means that unlike the embodiment described above with K=1 and D=1, one of two decimalized samples is rounded off to one of 8 levels of the set [−7, −5, −3, −1, +1, +3, +5, +7], and the other sample is rounded off to one of two levels of the set [−1, +1]. Correspondingly, at the correctly chosen time instant of beginning integration one of two samples matching one of two multiplexed signals (for example, S1) will be presented by three bits ($x_0$, $x_1$, $x_2$), and the other corresponding to the other signal (for example, S2)—by one bit.

In calculation of each of four convolutions for each quadrature, $m_1$, $m_2$, $m_3$, $m_4$ are selected as follows: weight $m_1$ is equal to $2^0$ (i.e., 1), if bits $x_0$ are contained in delay line elements $a_1$, $a_5$, $a_9$, $a_{13}$ and so on, i.e., elements with indexes giving remainder 1 after dividing by 4, and respectively in delay line elements $b_1$, $b_5$, $b_9$, $b_{13}$ and so on. If in these elements there are bits $x_1$, weight $m_1$ is equal to $2^1$, and if they contain $x_2$, weight $m_1=2^2$. Similarly, $m_2=1$, if the elements with subscripts giving remainder 2 after dividing by 4 ($a_2$, $a_6$, $a_{10}$, $a_{14}$, ... $b_2$, $b_6$, $b_{10}$, $b_{14}$, ... ) contain $x_0$. In case of $x_1$, weight $m_2=2^1=2$, and in case of $x_2$, weight $m_2=2^2=4$. In a similar way one can determine weight $m_3$ depending on the elements in the delay lines with indexes giving remainder 3 after dividing by 4, and weight $m_4$ depending on the elements in the delay lines with indexes giving remainder 0 after dividing by 4.

It should be noted that Embodiment A applies constants K=2, D=1; Embodiment B applies constants K=1, D alternatively equal to 2 or 0; Embodiment C applies constants K=1, D=1.

According to the proposed method, the reference signal is a sequence of +1 or −1. In some embodiments of the invention each chip of the reference signal is presented in the form of four equal by value neighboring elements of the reference signal, where the reference signal having only chips of one of two chip-by-chip multiplexed CSK signals. Embodiments A and B mentioned above are such embodiments. Some other embodiments, in particular, embodiment C, means the reference signal in which each chip is presented in the form of two equal-valued neighboring elements, the reference signal having chips of both chip-by-chip multiplexed CSK signals.

According to the proposed method, elements in delay lines of each quadrature, as well as reference signal, are coded by one bit indicating the sign of the coded unit.

In some embodiment of the invention, $I^p_{1\_4}$ and $Q^p_{1\_4}$ are partial values of possible Prompt, Early and Late. End results of predicted Prompt, Early and Late are obtained by storing of Nconv results $I^p_{1\_4}$ and $Q^p_{1\_4}$ with corresponding p calculated at different time moments, where Nconv is the integer greater than 1, with the rule acting: the length of delay lines of each quadrature L=Nchip*2/Nconv, where Nchip is the number of chips in both chip-by-chip multiplexed CSK signals transmitted in the time when end results in sets of predicted Prompt, Early and Late are calculated. Indicated time instants are spaced from one another by L shifts of delay lines of each quadrature.

In some embodiments, the reference signal used in convolution is stored in an array of L elements, the first L elements Nchip/Nconv corresponding to chips of multiplexed signal S12 being written in the array of storing the reference signal before the first calculation of $I^p_{1\_4}$ and $Q^p_{1\_4}$. Then, next L values are written in the array after each execution of L shifts in the delay line of each quadrature.

In some embodiment, for example, when signals with code length multiple of 1023 are received, the remainder after division L by 4 is 3. Weight sets Zero$^p$ used for the calculation of Prompt, Early and Late are modified after each writing of new L elements in the array with reference signal according to the rule: the new weight of the first convolution $z^p_1$ is assigned with the former weight of the second convolution $z^p_2$, the new weight of the second convolution $z^p_2$ is set at the former value of the weight of the third convolution $z^p_3$, the new weight of the third convolution $z^p_3$ is set at the former weight of the fourth convolution $z^p_4$, and finally, the new weight of the fourth convolution $z^p_4$ is set at the former weight of the first convolution $z^p_1$.

In another embodiment, weights $m_1$, $m_2$, $m_3$, $m_4$ are coded in the following manner: convolution numbers wherein delay line elements corresponding to inputted values $x_j$ with j>0 are coded by D registers $M^1$, ..., $M^D$, each of which contains four bits. These bits are designated hereinafter as $m^1_1$, $m^1_2$, $m^1_3$, $m^1_4$ for register $M^1$ and respectively, $m^D_1$, $m^D_2$, $m^D_3$, $m^D_4$ for register $M^D$. A bit=1 in, for example, $M^D$ register corresponds to presence in an associated convolution of elements with $x_j$ whose index j is equal to the number of the given register, i.e., D, and similarly for other registers. For example, $m^1_3$ (the register number=1, the convolution number=3) is equal to 1, if $x_1$ is included in elements $a_3$ and $b_3$ of delay lines of quadratures. In another embodiment, a bit=1 corresponds to presence in that convolution of elements with $x_j$ whose index j is greater or equal to the number of the given register. For example, $m^{13}$ must be equal to 1, if $x_1$ or $x_2$ ... or $x_D$ is included in $a_3$ and $b_3$ delay lines of quadratures.

In another embodiment, the D registers, and respectively, weights coded by them $m_1$, $m_2$, $m_3$, $m_4$ are modified according to the rule identical to that of Zero$^p$ used for obtaining Prompt, Early and Late. Thus weights $m^1_1$, $m^1_2$, $m^1_3$, $m^1_4$ from register $M^1$ are modified similarly to weights $z^P{}_1$, $z^P{}_2$, $z^P{}_3$, $z^P{}_4$. Weights in registers $M^2 \ldots M^D$ are modified in a similar way.

In another embodiment, weight sets $Zero^P$ are stored as four-bit numbers, where, similar to registers $M^1 \ldots M^D$, a bit $z^P{}_1$ determines the rule of the first convolution, in the second position—the second convolution and so on. After each writing of new L elements in the reference signal array, the four-bit numbers comprising the rules of first and so on convolutions are rotated. Rotate direction depends on whether the bit with subscript 1 is defined as the least significant bit (LSB), or as the most significant bit (MSB). Let the bits $z^P$ and $m^1{}_1 \ldots m^D{}_1$ be the least significant bits. In that case rotation of the registers $Zero^P$ is performed to the right. Similarly, registers $M^1 \ldots M^D$ are also rotated to the right. Otherwise, if the bits are MSB, the registers are rotated to the left.

The obtained sets of end values of possible Prompt, Early and Late are used as follows:
- in set Prompt (set Prompt, Early and Late hereinafter mean sets of end values of possible Prompt, Early and Late), comprising values obtained after summation of parts of convolution results at p=1, maximum P1 is determined. It yields a code offset Sp1, which was applied in convoluting of quadrature delay lines and reference signal elements having given P1. After that, the information symbol in signal S1 is determined according to the code offset. In some embodiments, maximum P2, corresponding code offset Sp2, and then symbol value in the other signal S2 are similarly determined using a set of possible Prompt values obtained after summation of parts of convolutions at p=4.
- Then or at the same time, in Early set obtained after summation of parts of convolutions at p=2, value E1 corresponding to code offset Set is determined; it can differ from code offset Sp1 no greater than one chip and is less than Sp1. Similarly, E2 is determined using Early set obtained after summation of parts of convolutions at p=5, as well as corresponding code offset Se2 differing from code offset Sp2 to smaller direction no greater than one chip.
- In set Late obtained after summation of parts of convolutions at p=3 (in some embodiments, they are identical to results with p=2), L1 corresponding to code offset Sl1 differing to a greater direction from code offset Sp1 no more than one chip is determined. Similarly, in some embodiments, L2 corresponding to code offset Sl2 differing to a greater direction from code offset Sp2 no more than one chip is determined using set Late obtained the same as set Early after summation of parts of convolutions at p=5.
- With the help of the E1 and L1, if they are available in sets Early and Late for signal S1, discriminator's value $$dI_1 = \frac{FuncEL(E1) - FuncEL(L1)}{FuncP(P1)}$$

is calculated, and in a similar way, using E2, L2 and P2 discriminator's value $dI_2$ is calculated.
- Further, using $dI_1$ and $dI_2$ for some embodiments, the estimated time of beginning of integration interval is improved. The improved time of beginning of integration interval is typically applied at reception of subsequent CSK symbols.

Functions FuncEL( ) and FuncP( ) in some embodiments return one of complex argument quadratures. In another embodiment, function FuncP( ) returns the sign of one of argument quadratures multiplied by estimated ensemble average of modulus of the quadrature, with the ensemble average being calculated through modulo of the given quadrature in arguments P1, and in some embodiments, P2 obtained through a large number of CSK symbols.

In some embodiments, maximum P1 and P2, if available, are calculated according to the criterion of maximal power equal to the sum of squares of two quadratures of each set Prompt. In one more embodiment, this maximum is determined using one quadrature in values comprised by the set.

Note that different embodiments, in particular, A, B, C, allow us to obtain improved results based on one or more pre-set criteria, assuming the same number of bits in quadrature delay line. To estimate advantages of each embodiment, characteristics of the obtained results should be considered from the energy loss point of view, as well as availability or unavailability of the desired results.

FIG. 1 shows a structure of the reference signal according to embodiment A. A fragment of four chips of the transmitted chip-by-chip multiplexed signal S12 is designated by four rectangles 101, 103, 105 and 107. At zero carrier frequency, i.e., before shifting to a radio frequency in a transmitter, or after shifting to zero frequency in a receiver, BPSK-modulated chips look like constants within interval equal to chip duration, unless interference/deteriorations occurs. Their envelope marked in bold corresponds to the waveform of the transmitted ideally generated signal. This ideal input signal is similarly designated in FIGS. 2, 3.

The duration of each elements in time (101, 103, 105, and 107) is equal to chip duration. At receiver's input, this signal due to distortions is shaped as 150. Since code offsets in signals S1 and S2 in chip-by-chip multiplexed CSK signal S12 can be combined in an arbitrary way, odd and even chips are generated independently, hence correlators integrate them also independently. To calculate potential Prompt results, the correlator uses such reference signal and such rules of adding convolutions, that during S2 signal chips reception an equivalent reference signal for a simple correlator is equal to zero (fragments of reference signal 111 and 115), and during reception of signal S1 the equivalent reference signal for the simple correlator corresponds to predicted chips (fragments of reference signal 113 and 117).

The equivalent simple correlator means hereinafter a correlator wherein the result is calculated as a continuous convolution of the complete input signal S12 with the whole reference signal. To calculate potential Early results, the correlator uses such reference signal and such rules of adding convolutions that during S2 signal chips reception the equivalent reference signal for a simple correlator is equal to zero (fragments of reference signal 121 and 125), during the first half chips of S1 signal reception the equivalent reference signal corresponds to the predicted chips (fragments of reference signal 123 and 127), and during reception of the second half of the S1 signal chips the equivalent reference signal is equal to zero (fragments of reference signal 124 and 128).

Respectively, to calculate potential Late results, the correlator uses the reference signal and such rules of adding convolutions that during reception of signal S2 chips the equivalent reference signal for a simple correlator is equal to zero (fragments of reference signal 131 and 135), during reception of the second half signal S1 chips the equivalent reference signal corresponds to predicted chips (fragments of reference signal 134 and 138), and during reception of the first half signal S1 chips the equivalent reference signal is equal to zero (fragments of reference signal 133 and 137). It should be noted that in Embodiment A input signal 150 is held in quadrature delay lines in the form of four-level (2-bit) numbers.

The results of signal integrations within integration intervals corresponding to chips 101 and 105 is not moved in the quadrature delay lines. Consequently, in Embodiment A Prompt, Early, and Late results are calculated only for one of the two multiplexed signals. All the three results (Prompt, Early, and Late) are calculated at the same time by adding four convolution results according to expression 3. To receive signal S2 corresponding to chips 101 and 105, it is needed the second device with a similar implementation of the proposed method wherein in quadrature delay lines there will be moved in only results of integrating this signal, in particular, intervals 101 and 105, whereas results of integrating signal S1, namely, 103 and 107 will not be moved in.

Figure 2:
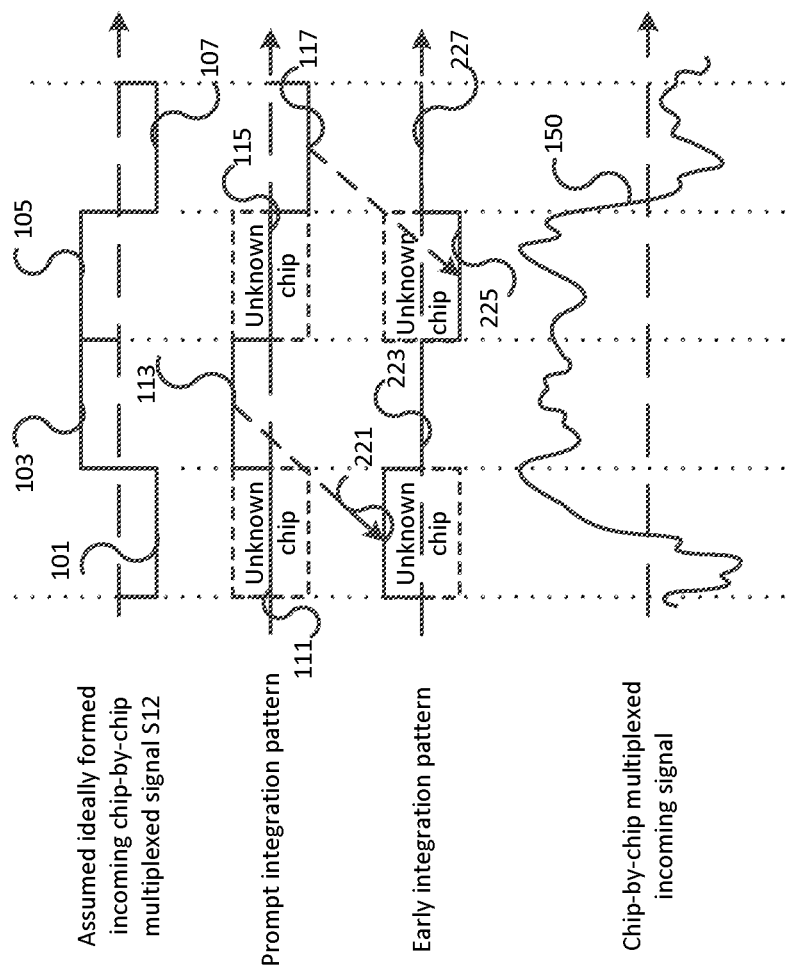
FIG. 2 illustrates a structure of an equivalent reference signal for a simple correlation for embodiment B of the invention.

FIG. 2 shows a structure of an equivalent reference signal for a simple correlation for Embodiment B. For time intervals corresponding to chips 101, 103, 105, 107 in FIG. 1, the envelope of the reference signal in Prompt calculations is described by the same rules as in Embodiment A. To calculate potential Early results, the correlator uses such reference signal and such rules of adding convolutions that during S2 signal chips reception the equivalent reference signal for a simple correlator is equal to predicted signal S1 chips at next time intervals (fragments of reference signal 221 and 225), and during reception of signal S1 chips the reference signal is equal to zero (fragments of reference signal 223 and 227). The same results are used as possible Late results to calculate Prompt values corresponding to the other predicted code offset in the received symbol of signal S1.

It should be noted that in Embodiment B the input signal 150 is held in quadrature delay lines in the form of alternative 8-level (3-bit) and 2-level (one bit) numbers, the 3-bit values being multiplied by fragments of reference signal 113 and 117 in calculating convolutions, and hence they affect Prompt results, while one-bit values being multiplied by fragments of reference signal 221 and 225, hence they affect Early results. Prompt and Early results (in some embodiments, Prompt and Late) are calculated at the same time by adding four convolution results according to expression 3.

Figure 3:
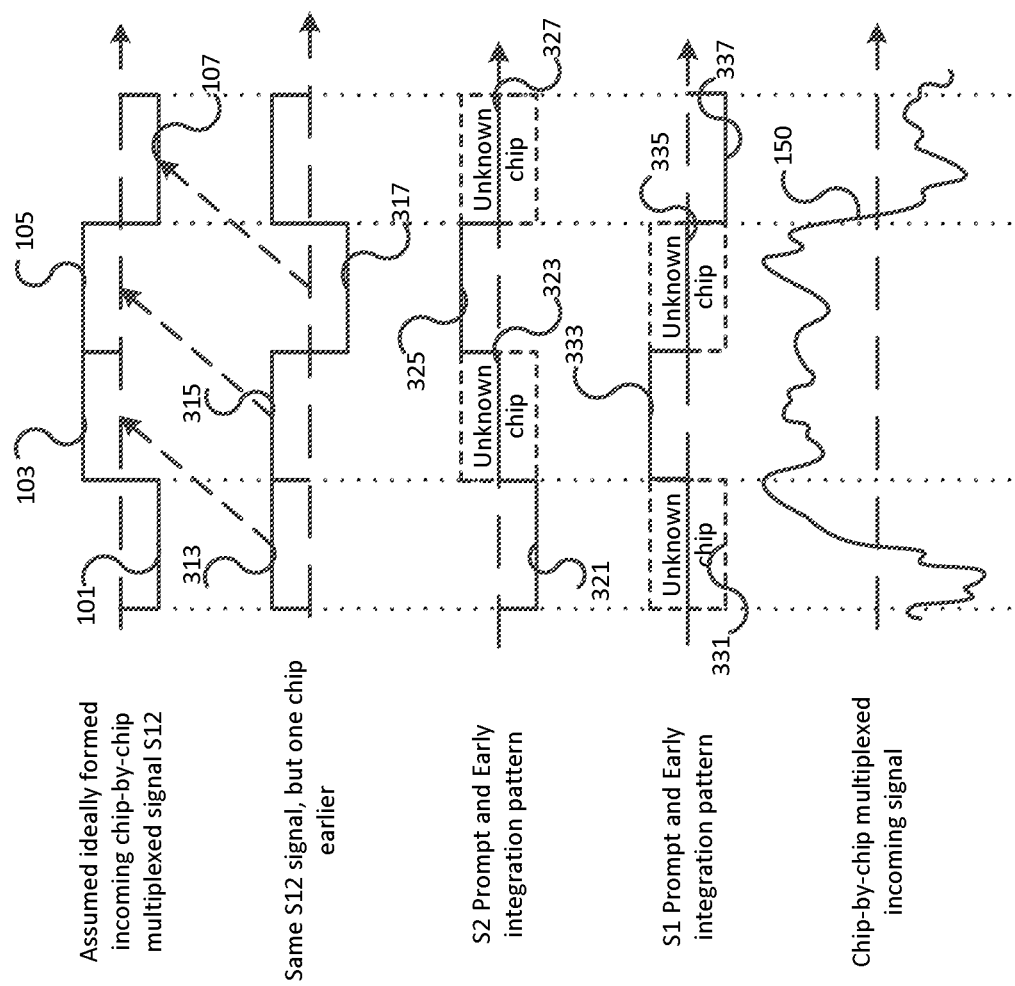
FIG. 3 illustrates a structure of an equivalent reference signal for a simple correlation for embodiment C of the invention.

FIG. 3 shows a structure of an equivalent reference signal for a simple correlation for Embodiment C. According to this embodiment, potential Prompt and Early, as well as Late results are calculated at different time moments. Prompt and Early (the same as Late for a different Prompt) are calculated for both received multiplexed signals. Potential Prompt for the first and second signal are calculated at the same time according to summation results of the same four convolutions (see expression 3). Simultaneously, based on results of adding the same four convolutions but at a different time instant potential Early results for the both signals are calculated. A delay between Early and Prompt calculations corresponds to one chip duration.

In FIG. 3 the elements of the ideal input signal that have been labeled 103, 105 and 107 are depicted as elements 313, 315 and 317 shifted by one chip duration in time relative to elements 103, 105 and 107. To calculate potential Prompt results of each of the two signals, the correlator uses the reference signal and such rules of adding convolutions that Prompt of signal S1 is calculated as follows: during reception of S2 chips the equivalent reference signal for a simple correlator is equal to zero (fragments of reference signal 331, 335), during reception of signal S1 the equivalent reference signal for a simple correlator corresponds to predicted chip values of signal S1 (fragments of reference signal 333, 337). Prompt values of signal S2 are calculated in a similar way: during reception of S1 chips the equivalent reference signal for a simple correlator is equal to zero (fragments of reference signal 323 and 327), during reception of signal S2 the equivalent reference signal for a simple correlator corresponds to predicted chip values of signal S2 (fragments of signal 321 and 325). Potential Prompt results for the first and second signals are obtained in convolution of these reference signals with elements of input signal 101, 103, 105 and 107. To obtain potential Early results, the same reference signals are convoluted with the input signal at a different time instant, and as a result, the elements of the reference signal 321, 323, 325 and 331, 333, 335 are multiplied by elements 313, 315, 317, rather than by 101, 103, 105. It should be noted that in Embodiment C input signal 150 is stored in quadrature delay lines as four-level (2-bit) numbers.

Note that Embodiment B provides the least energy loss in calculation possible Prompt values of one of the two multiplexed signals, since signal elements affecting Prompt results are stored in delay lines in the form of 8-level (3 bit) representation.

Embodiment A ensures the smallest energy loss of Early and Late calculations for one of the two signal: signal elements affecting Early and Late results are held in delay lines as four-level (2-bit) representation, and even if disregard input signal representation, the energy characteristics of Early-Late correlator in Embodiment A are 3 dB better than that of Embodiments B and C due to narrower implementation of the Early-Late correlator.

The main advantage of Embodiment C is a simultaneous calculation of Prompt, Early and Late results for the two multiplexed signals.

It should be noted that for the best performance both Prompt and Early-Late results should be calculated as precisely as possible. Coarse Prompt calculation, which can be considered as an ideally calculated value plus a distortion, increases mean squared error (MSE) of the results. MSE is increased as it becomes a sum of noise power plus a power of the distortion. The coarsely calculated Early-Late leads to increased MSE of the DLL input. As result, the DLL adapts the time position of where quadrature integration interval begins with lesser accuracy. Less accurate time position causes an energy loss of Prompt. Thus, a coarse Prompt calculation increases denominator in the signal SNR, and a coarse Early-Late decreases SRN numerator.

It should be also noted that calculation of $2^M$ possible Prompt, Early and Late results needed for an efficient reception of CSK symbols of M bits is produced at $2^M$ time instants in Embodiment A. In Embodiment B requires $2^M+1$ time instants for the same procedure, since one possible value of Late (for some embodiments—Early) cannot be calculated in these $2^M$ time moments. In Embodiment C all possible Prompt, Early and Late results for the both signals are calculated in $2*2^M+2$ time instants. In some embodiments, an additional calculation of four convolutions used in expression 3 is not made for Embodiments B and C with the help of the described parallel correlator, which makes impossible to adjust the beginning of the mentioned integration interval (the moment that corresponds to beginning of chip) if a symbol with value 0 or $2^M-1$ is received. When such symbols are present in a large number in transmitted CSK modulated data, the impossibility of TRS operation with these symbols causes noticeable additional energy loss in tracking loops. To avoid this, in some embodiments the insufficient correlation characteristic in set Early or Late is obtained by a simple correlator or some simple correlators which the receiver uses to track satellite non-CSK signals. In some embodiments, another one or several simple correlators additionally calculate Early value, from which Late value being calculated with a different simple correlator is subtracted in case of receiving symbols 0 or $2^M-1$. This operation avoids systematic errors due to different properties of simple correlators and the correlators implemented according to the present invention.

Embodiments A, B and C have the same sequence of operations:

during a time interval equal to the total time of transmitting one chip of the first multiplexed signal and one chip of the second multiplexed signal, two numbers of 4-bit of their total digit capacity are assigned with each particular quadrature, and these numbers for each quadrature being further moved in the delay line of each quadrature;

four convolutions of the moved in bits with the reference signal are calculated for each quadrature, one of the four moved bits from each of the number pairs being participated in one and only in this one convolution;

some end results are calculated for each quadrature, each result is obtained by summation of four convolutions, each of which is multiplied by the weight, taking numbers either 0 or 1, or 2, or 4, after that end results are combined in the common end complex results for two quadratures obtained at the same time moment.

Figure 4A:
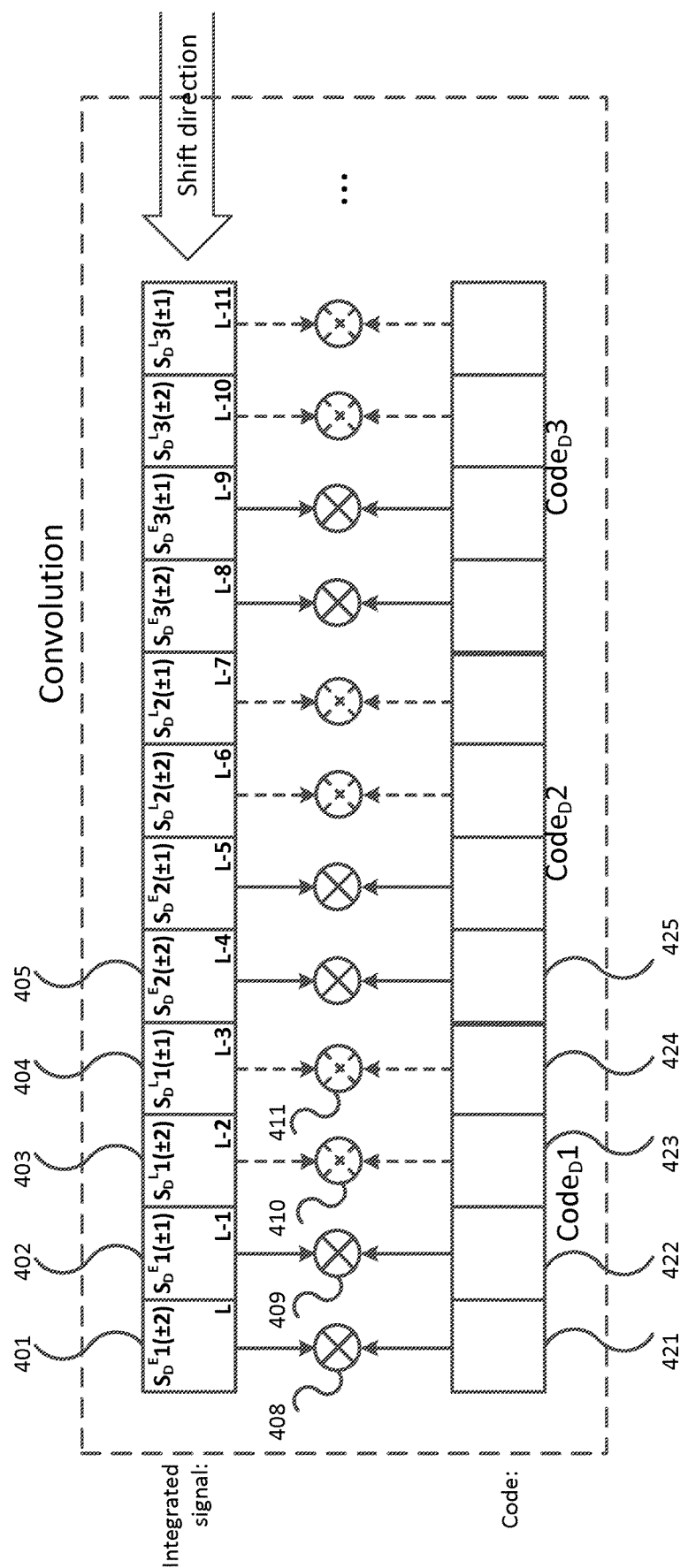
FIGS. 4A-4D illustrate position and content of a delay line fragment for one quadrature at the moment of calculating four convolutions ($I_1Q_1$, $I_2Q_2$, $I_3Q_3$, $I_4Q_4$), after addition of which possible Prompt, Early and Late results are calculated according to embodiments A, B, C.

In some embodiment of the invention, chip-by-chip multiplexed QZSS L6 D and QZSS L6 E CSK signals are received. According to Embodiment A, such an input signal after move to zero frequency is integrated in each quadrature over half chip interval, the obtained number is presented as signs + or − at 1 multiplied by 2 or 1, then these signs are coded by 0 or 1, and after that, each of coding bits is moved in the delay line of the corresponding quadrature. The obtained bits are moved in only after integrating one of the two multiplexed signals with assumption that chip beginnings of the multiplexed signals are properly estimated. FIG. 4A shows the position of a delay line fragment for one quadrature at the moment of calculating four convolutions, after addition of which possible Prompt, Early and Late results are calculated according to Embodiment A. Let us consider reception of signal L6 D which is regarded as signal S1 as an example. In the delay line of one quadrature in element 401 there is bit x1 coding a quantized result of integrating the first half of the first chip of signal D in this quadrature. The first chip of signal D hereinafter it is meant a chip corresponding the first bit of PRN code of signal QZSS L6 D. In element 402 there is bit x0 which is the second bit coding a quantized result of the same integration. Similarly, in elements 403 and 404 there are coded values x1 and x0 for the second half of the first chip of signal L6 D in the given quadrature. Element 405, similarly to element 401, contains the information about x1 sign determining the quantized result of integrating the first half of the second chip. All numbers x0 and x1 in this invention are coded by one bit.

In some embodiment of the invention L bit is stored in delay lines of each quadrature, the L being smaller than code length. It means that element 401 corresponds to the element with index L of the delay line, and elements 402, 403, 404, 405 correspond to the delay line elements with indexes L−1, L−2, L−3, L−4. A new bit is moved in the delay in the element having index 1, and the former elements with indexes 1−(L−1) are re-written in elements with indexes 2−L. In case of receiving QZSS L6 signal the length of each multiplexed code is equal to 10230 chips. In some embodiments of the invention L=1023. It means that at the beginning of receiving the next symbol each quadrature delay line contains coded x0 and x1 for first 255 chips (chips 1 . . . 255), x0 and x1 for the first half of chip 256 and x1 for the second half of chip 256. Elements of the reference signal 421, 422, 423 and 424 contain the identical numbers equal to the predicted value of chip 1 in signal L6 D with no code offset. Element 425 and next three elements have the identical numbers equal to the predicted number of chip 2. The last three elements of the reference signal (elements with indexes 3, 2 and 1) contain the identical numbers equal to the predicted number of chip 256. Since a remainder of dividing 1023 by 4 is 3, the multiplication product of element 401 and 421 that corresponds to multiplication in expression (1), (2) with index 1023, of elements 405 and 425 that corresponds to multiplication with index 1019 and so on with element numbering step of 4, are added and further used as a result of the third convolution. The multiplication product of element 402 and 422 and so on with element numbering increment of 4 are added and further used as a result of the second convolution.

Then, the result of the third convolution is multiplied by 2 and added to the result of the second convolution and thus a possible partial result of Early value is obtained. These convolutions results are added to the results of the first and fourth convolutions to obtain a partial possible Prompt result. Note that the result of the first convolution obtained from multiplying elements 403 and 423 and others such pairs with step 4 is taken (similarly to the third convolution) with weight 2, while the result of the fourth convolution obtained from multiplying elements 404 and 424 and so on is taken (similarly to the second convolution result) with weight 1. Summation result of the first and fourth convolutions is used separately to obtain a partial possible Late result. For the sake of clarity, multipliers 408 and 409 participating in Early calculation and their inputs are designated by solid lines, and multipliers 410 and 411, participating in Late calculation, as well as their inputs—by dotted lines.

After completion L=1023 shifts in quadrature delay lines, new values are written in elements of the reference signal 421, 422 and so on. Note that a value equal to the predicted value of chip 256 at zero code offset is written in element 421, a value equal to the predicted number of chip 257 at zero code offset is written in elements 422 . . . 425 and so on. At this time instant, there is x0 of the second half of chip 256 in element 401. This half chip was absent in the delay line of this quadrature at the moment of calculating previous convolutions, when in element 401 there was bit x1 coding a quantized result of integrating the first half of the first chip in signal L6 D in this quadrature. It can be that the missed x0 of the second half of chip 256 was virtually present in a non-existing element of the delay line with index 0. This element, according to the remainder of dividing its index by 4, is to be participate in the fourth convolution. Therefore, the result of the third convolution after updating elements of the reference signal will be used in further calculating according to the rule that was applied to the result of the fourth convolution before updating the reference signal elements.

The rules for different convolutions are re-determined in a similar way: the previous rule of the third convolution becomes the rule for the use of the second convolution, the previous rule of the second convolution becomes the rule for the use of the first convolution; the previous rule of the first convolution becomes the rule for the use of the fourth convolution.

According to Embodiment B, an input signal after move to zero frequency is integrated in each quadrature over whole chip interval, the obtained number is presented as signs + or − of 1 multiplied by 4, 2, and 1 for chips of the selected multiplexed signal designated by S1. Based on the obtained signs Prompt values are calculated afterwards. For time instants corresponding to chips of the other signal, designated as S2, integration results are presented as signs + or − of the 1. Afterwards Early and Late values are calculated based on the obtained signs. The signs are coded by 0 or 1, after that, each of coding bits is moved in the delay line of the corresponding quadrature. The obtained bits are moved after integrating the signal related to chips of both multiplexed signals.

Figure 4B:
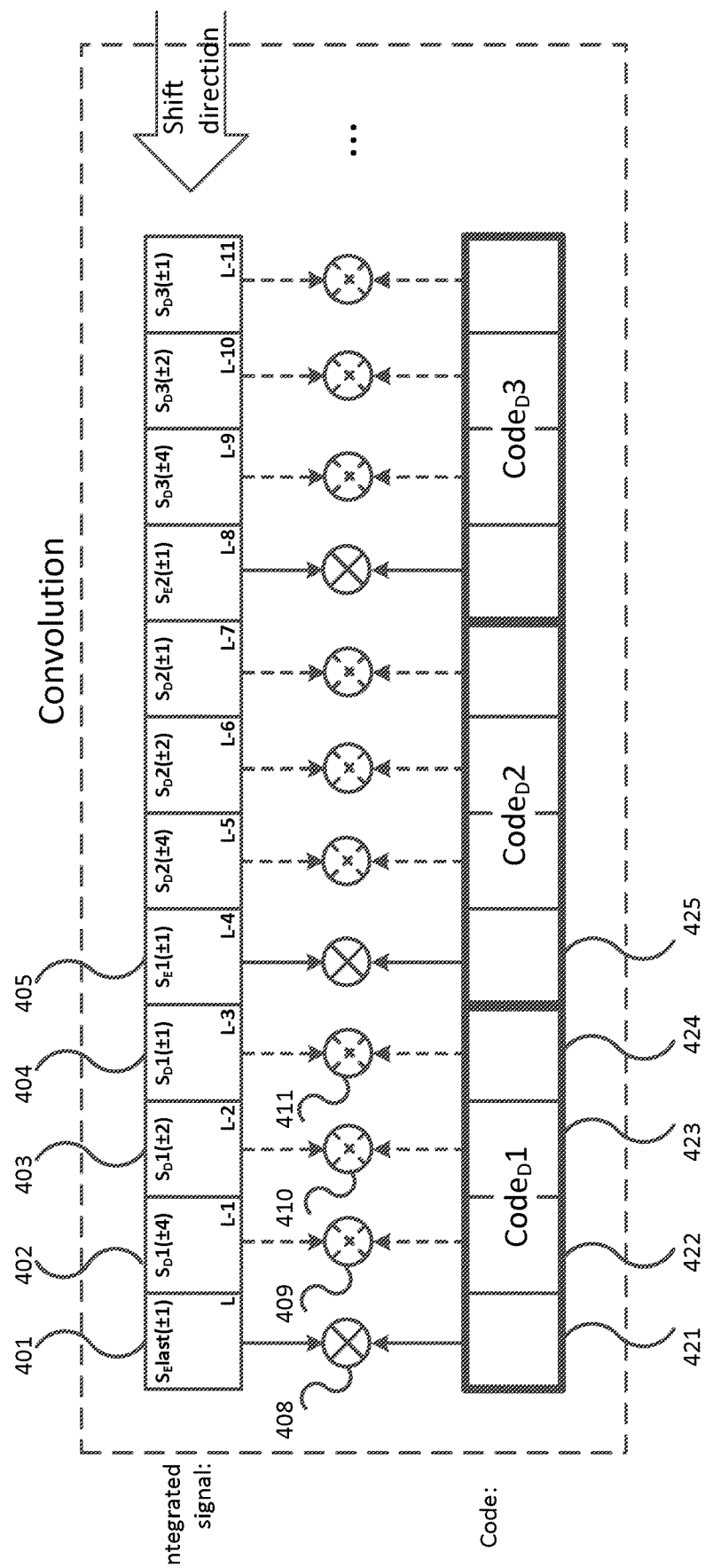

FIG. 4B shows content of a delay line fragment for one quadrature at the moment of calculating four convolutions, after addition of which possible Prompt and Early results are calculated according to Embodiment B. Filling elements of the reference signals 421, 422, 423 and 424 in Embodiment B is identical to that of Embodiment A. At the same time, delay line elements of each quadrature are filled in a different way. Element 401 contains a value corresponding to x0 sign for the quantized result of integrating signal L6E in reception of chip previous to the first chip L6 D, elements 402, 403 and 404 contain respectively x2, x1 and x0 signs of the quantized result of signal integrating in reception of the first chip L6 D.

Further, one bit of the quantized number of the first chip L6 E, three bits of quantized number of the second chip L6 D and so on are comprised in the delay lines of each quadrature. For the sake of clearness, multiplier 408 participating in Early calculation and its inputs are designated by solid lines, and multipliers 409, 410, and 411, participating in Prompt calculation, as well as their inputs—by dotted lines.

According to Embodiment C, an input signal after move to zero frequency is integrated in each quadrature over whole chip interval, the obtained number is further presented as signs + or − of 1 multiplied by 2 and 1, these signs being coded by 0 or 1, after that, each of coding bits is moved in the delay line of the corresponding quadrature. The obtained bits are moved in after integrating the signal related to chips of the both multiplexed signals.

Figure 4C:
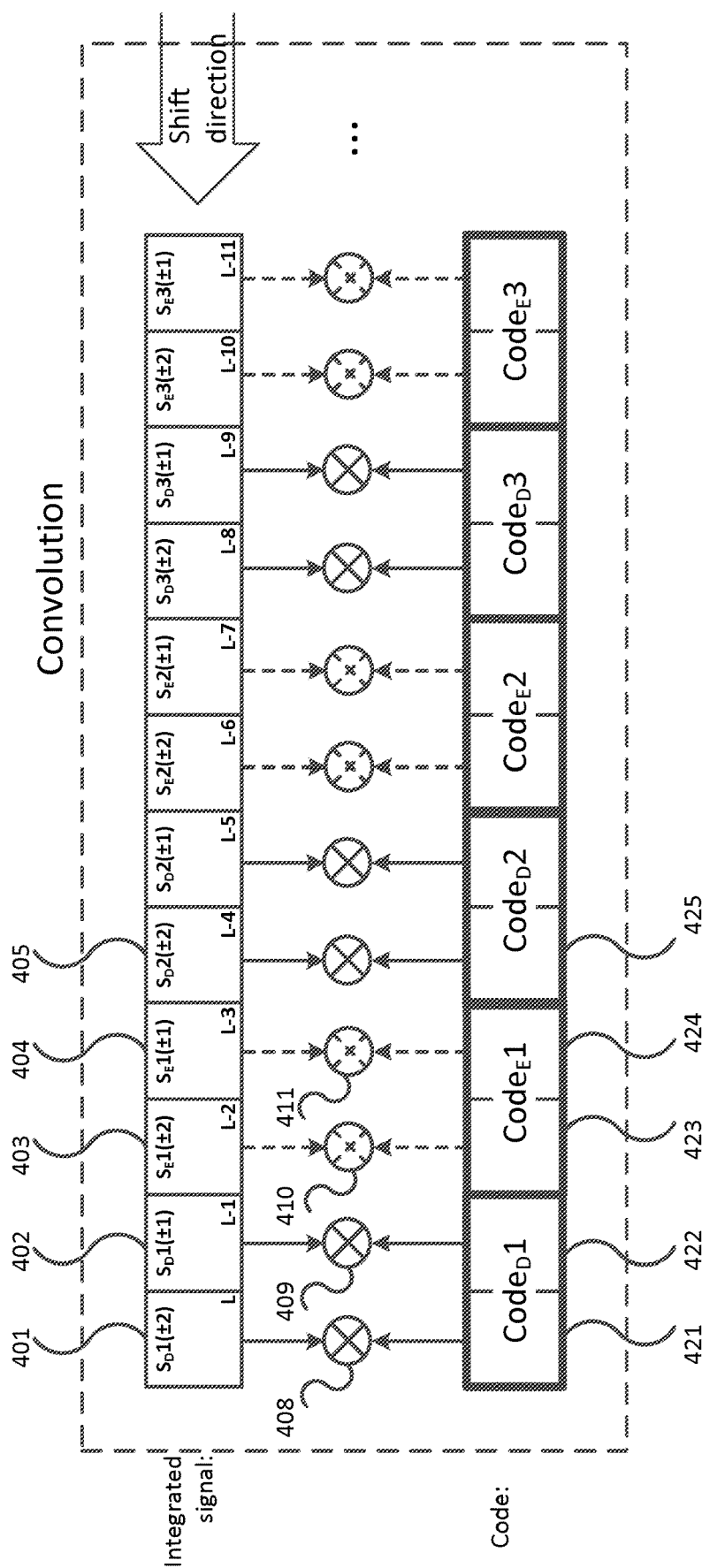
Figure 4D:
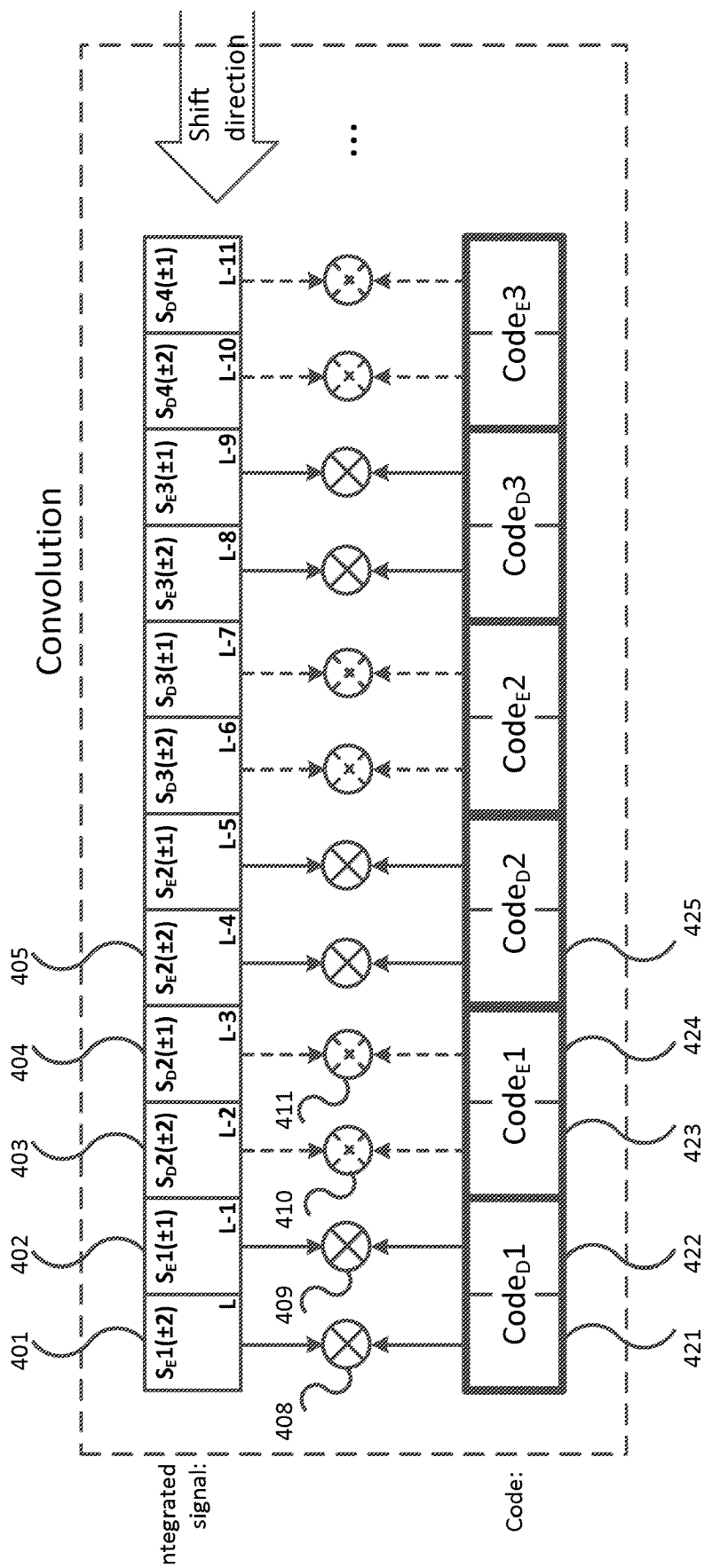

FIG. 4C shows content of a delay line fragment for one quadrature at the moment of calculating four convolutions, after addition of which possible Prompt for each multiplexed signals is calculated according to Embodiment C. For the sake of clearness, multipliers 408 and 409 participating in Prompt of signal D calculation and their inputs are designated by solid lines, and multipliers 410, and 411 participating in Prompt of signal E calculation, as well as their inputs,—by dotted lines. Content of the quadrature delay line fragment at the moment of calculating four convolutions, after addition of which a possible Late value for each multiplexed signal is obtained according to Embodiment C is shown in FIG. 4D. It should be emphasized that Late obtained in this position of delay lines of each quadrature corresponds to possible Prompt values from FIG. 4C. The same values are equal to possible Early values for next possible Prompt.

From FIGS. 4C and 4D it follows, that at the moment of calculating convolutions for a possible Late the element 401 contained a value which was in element 403 at the moment of calculating the corresponding Prompt. The content in other elements of delay lines of the given quadrature changes in a similar way.

For the length of the delay line of each quadrature L=1023 in Embodiments B and C, the rules of using the results of four convolutions after updating elements of the reference signal are similar to that of Embodiment A.

In some embodiments, the rules of using the results of four convolutions for each quadrature, as well as the rules of signal integration, its quantization and location in a delay line can be changed in the process of operation. In some embodiments, the rules are changed so that at a first configuration the signal is received according to one embodiment, e.g., B, then at a second configuration the signal is received in accordance with another embodiment, e.g., C. It allows the receiver with two modules operating according to this invention either to receive two pairs of the multiplexed CSK signals from two QZSS satellites (embodiment C) or to receive each multiplexed signal of one satellite apart by the modules configured according to Embodiment B, if reception of signals is possible from the only satellite. In this case the quality of Prompt for each multiplexed signal will be better.

Figure 4E:
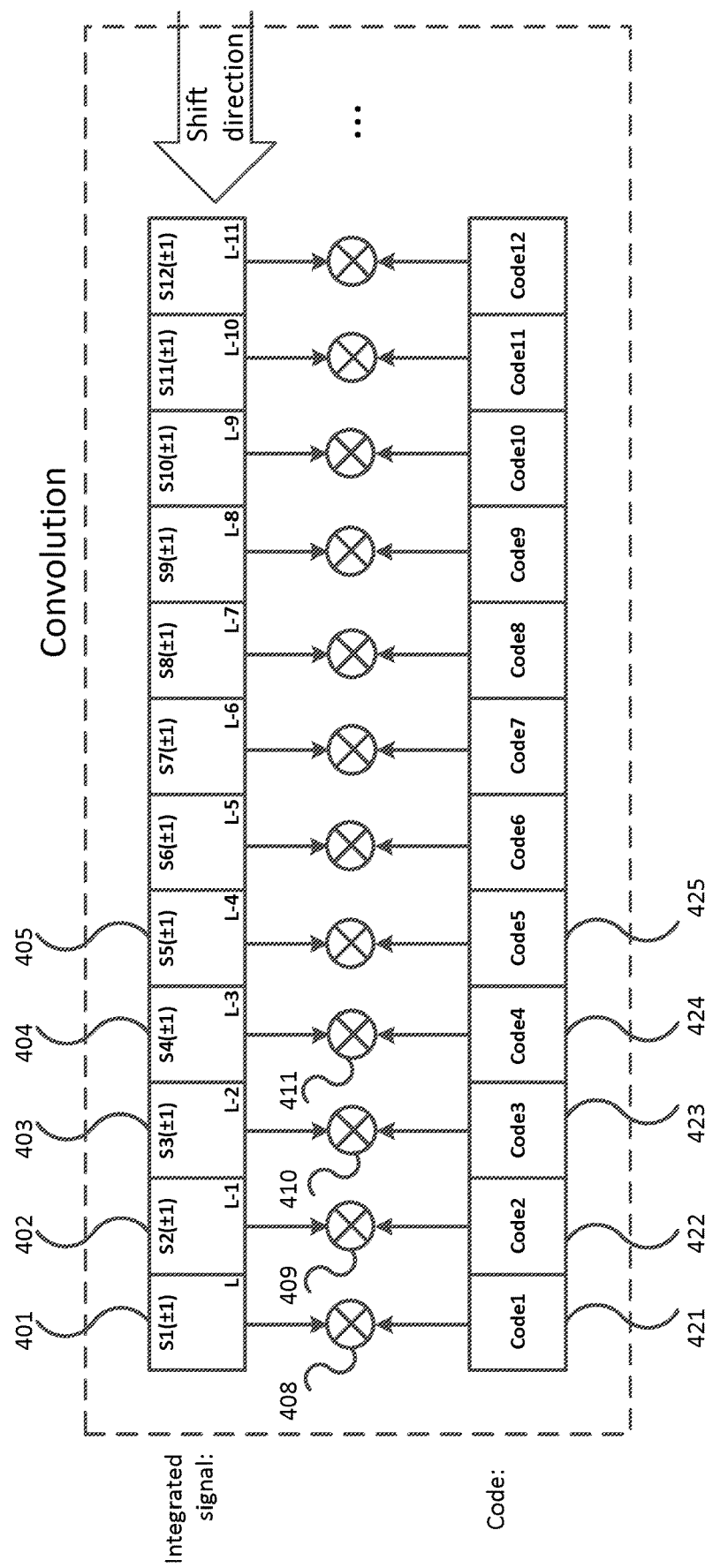
FIGS. 4E and 4F illustrate content of a delay line fragment of an input signal quadrature, and reference signal elements when receiving a non-CSK signal.

It is also possible in some embodiments to apply a configuration different from embodiments A, B and C. For example, the receiver is configured such that the input signal after move to zero frequency is integrated in each quadrature within chip duration interval, the obtained number is presented as signs +1 or −1, then these values are coded by 0 or 1, after that these one-bit numbers are moved in the delay line of the corresponding quadrature. The received signal can have structure different from multiplexed CSK signals. In particular, it can be a non-CSK PRN signal, such as GPS L1 CA. The content of a delay line fragment of an input signal quadrature, and reference signal elements when receiving the non-CSK signal is shown in FIG. 4E. When the signal is received according to this configuration, the results of four convolutions are added with the same weight and a possible Prompt value for this signal is obtained. This operation can be performed when the moment of arriving the first code chip is known with an error comparable to the chip duration, or this moment is completely unknown.

Figure 4F:
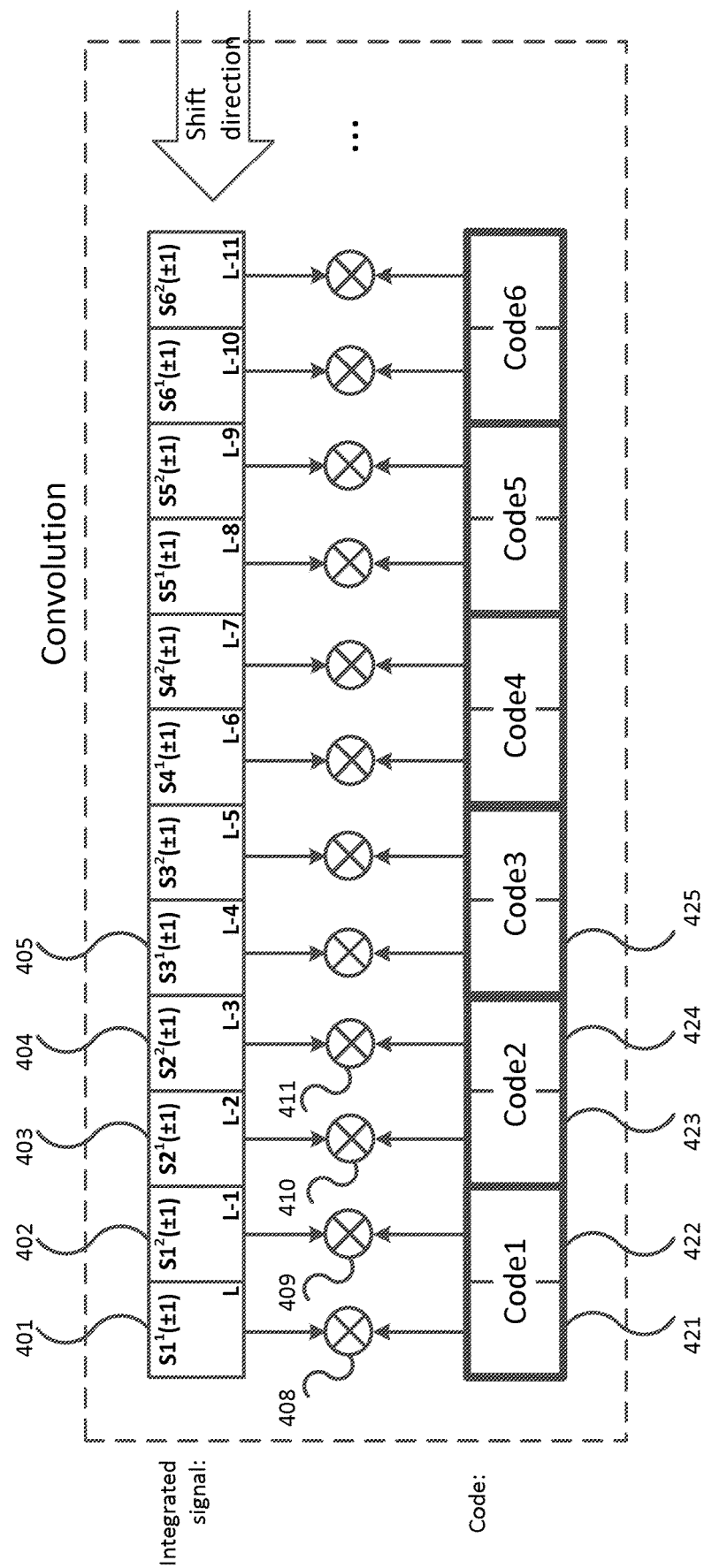

In another embodiment, a signal with non-CSK modulation is integrated in each quadrature over half chip duration after shifting it to zero frequency. The moment of the first chip of the signal is unknown. The integrated values are presented as signs +1 or −1, coded by 0 or 1, after that these 1-bit numbers are inserted into the delay line of the corresponding quadrature. The content of a delay line fragment of a quadrature, and reference signal elements when receiving non-CSK signal is shown in FIG. 4F. When the signal is received according to this configuration, the results of four convolutions are added with the same weight and a possible Prompt value for this signal is obtained.

In some embodiments, a shift of quadrature delay lines and insertion of a new bit into them are performed at time moments depending on the instants of beginning integration as follows:

$$t_{shift} = t_{intgration\ start} + l * \frac{T_{chip}}{K*(D_{max}+1)}$$

where l is the integer in a range $0 - K*(D_{max}+1)-1$, $D_{max}$ is the maximum D for this embodiment, K is the number by which chip duration is divided to obtain the duration of integration interval for the given embodiment.

The value $$\frac{T_{chip}}{K*(D_{max}+1)}$$

defines a period (inverse of frequency) of clocks in accordance with which new bits are moved in quadrature delay lines, and 1 defines the clock number within one chip. In embodiments with K>1 (for example, embodiment A) or with alternative D (e.g., embodiment B), new bits are moved in not every clock.

The clocks $t_{shift}$ in some embodiment are numbered. The rules, according to which determined bits are moved in quadrature delay lines, and according to which moments for calculating Prompt, Early and Late are performed, being implemented in the form of a function depending on the clock number $l_{full}$, where $l_{full}$ is the number of the clock within one symbol, and $l=l_{full}$ MOD $(K*(D_{max}+1))$, i.e., the remainder of dividing $l_{full}$ by $(K*(D_{max}+1))$. Note that in some embodiments, the moment of calculating next possible Prompt is defined as the time when 1 MOD $(4*K)=C_{Prompt}$, and the moment of calculating next possible Early or Late is defined as the time when 1 MOD $(4*K)=C_{EL}$, where $C_{Prompt}$ and $C_{EL}$ are constants.

Results and processing of the end results of possible Prompt and (if available) Early, Late are performed as follows:

At the beginning of new CSK symbol reception or (in some embodiments) at the beginning of reception of a non-CSK signal all sets of possible Prompt, Early and Late are emptied, $l_{full}$ is zeroed;

according to clock number 1 or $l_{full}$, the moment of moving in next bit in delay lines is determined, the clocks, when the quadrature delay lines are shifted and new bits are moved in them, being calculated as $l'_{full}$;

first $I^P{}_{1\_4}$ and $Q^P{}_{1\_4}$, that are obtained before the first update of reference signal elements (i.e., at the beginning of the CSK symbol), are stored in memory according to an addresses defined by clock number l'. The address is calculated using the following rule: Addr=$l'_{full}$ MOD L. Since before the first update of reference signal elements $l'_{full}$<L, the following is true as well: Addr=$l'_{full}$ MOD L=l' further, new $I^P{}_{1\_4}$ and $Q^P{}_{1\_4}$ are added to the values stored at addresses Addr=$l'_{full}$ MOD L, then, the obtained sum is stored at the same address;

when the latest update of the reference signal elements for the given symbol is over (i.e., at the end of the CSK symbol), the obtained sums according to l' MOD 4 is qualified as either a new result for a set of possible Early and/or a new result for a set of possible Late values, or a result unappropriated for further use. Note that when chip-by-chip multiplexed CSK signals are received, a new result for each set of each multiplexed signal is generated at one of four l' MOD 4, but when a non-CSK signal is received (in some embodiments),—at any l'.

if the new result is defined as related to the set of possible Prompt values for this signal, it is compared with maximum Pt or (if any) P2 among the previous results of the given set, and if the new result is greater, it is assigned as a new maximum, while the corresponding code offset is further used as Sp1 or (if available) Sp2 respectively. If CSK signal is received, the code offset in the received symbol Sp1 or (if available) Sp2 is calculated according to Sp1 (or Sp2)=Addr DIV 4, where DIV is the integer part of division, and if non-CSK signal is received, the delay of the first code chip is Addr/K.

if the new result is defined as related to the set of possible Early or Late for the given CSK signal, a code offset of related Prompt is also calculated for this result. In some embodiments, such as Embodiment A, the code offset for a result from the Early set is regarded as matching Sp1, if the condition Se1=Addr DIV 4=Sp1 is met. Similarly, the code offset for a result from Late set is regarded as matching Sp1, if the equation: Sl1=(Addr DIV 4)+1=Sp1 is met. In another embodiment such as Embodiment C, the code offset for a result from the Early set is regarded as matching Sp1, if the equation Set (or Se2)=(Addr DIV 4)-1=Sp1 (or Sp2), and for the result of Late set, if Slt (or S12)=(Addr DIV 4)=Sp1 (or Sp2). After the corresponding condition is fulfilled, the new result related to Early set is further used as E1 or (if available) E2, and the new result related to Late set as L1 or (if available) L2.—once all the results for sets Prompt, Early and Late are obtained, these results are used to determine data bits being modulated in the CSK-symbol, and to estimate an error value to be fed to a DLL input, as it has been described above.

after that, the sequence of operations is repeated for a next symbol.

The proposed method of receiving chip-by-chip multiplexed CSK signals with ability (in some embodiments) to be configured for searching for a first chip of non-CSK PRN signals can be implemented as a multi-band satellite navigation receiver, hereafter, a GNSS-receiver. According to some embodiments in such a receiver, satellite signals are used to determine position, velocity and time as follows:

the apparatus is configured to receive non-CSK signals shown in FIG. 4E or 4F;

a non-CSK signal, for example GPS L1 CA, is fed to the input of the apparatus;

a code offset and an integration moment corresponding to maximal Prompt are determined for at least one signal GPS L1 CA;

the information on code offset and integration moment for at least one found GPS L1 CA signal is transmitted to a tracking unit in the receiver;

the found satellite signal or some other GPS L1 CA signals are tracked by the tracking unit.

In a "hot start" mode or A-GNSS mode there is also tracking of some other satellite signals in the tracking unit, the predicted code offset of the signals is determined according to the code offsets of already locked signals and known satellite ephemerides for the given mode;

after that, the apparatus is configured to receive chip-by-chip multiplexed CSK signals in accordance with Embodiments A, B or C;

QZSS L6 signal is fed to the input of the apparatus;

the moment of beginning integration of QZSS L6 CSK signal for those satellites that transmit both GPS L1 and QZSS L6 is specified according to information in the GPS CA signal or by other means, the CSK signal being tracked in a delay locked loop providing maximal SNR in the demodulated signals. The DLL being fed by vectors Prompt, Early and Late from the apparatus, the delay correction being fed back to the apparatus and applied as adjustment of time moments associated with beginning of the integration intervals;

data being transmitted in QZSS L6 signal is demodulated, then the transmitted digital information is obtained considering the known frame structure;

corrections to raw data outputted by the unit tracking non-CSK signals are calculated based on the received digital information in QZSS L6 signal;

a current position, velocity, and the current time are calculated based on the corrected raw data.

It should be noted, that the given sequence of operations is not limited to the above description.

In some embodiments non-CSK signals are received not only in the L1 band, and not only GPS CA.

In one more embodiment Prompt results of CSK signals are used to specify carrier frequency and phase of QZSS L6 signal, thus they are fed to both DLL and carrier PLL.

The proposed apparatus comprises four correlators that calculate four quadrature results that are referred in description above as to $\{I_1, Q_1\}$, $\{I_2, Q_2\}$, $\{I_3, Q_3\}$, $\{I_4, Q_4\}$. The correlators, hereafter numbered by index k, k=1 . . . 4, perform punctured convolution of arrays of two-level input elements (the levels are: +1, −1), so that only each fourth element from input arrays participates in convolution result of each correlator. In some embodiments, correlator with k=1 takes elements with numbers 1, 5, 9, 13 . . . from the arrays, the correlator with k=2 takes elements with numbers 2, 6, 10, 14, and so on, so that each element participates in the only punctured convolution. The input arrays are implemented as shift registers, where each bit codes one two-level value of certain input element. Each correlator outputs a correlation of a shift register with digitized signal of the first quadrature and a register with a locally generated PRN code providing a first quadrature result, and a correlation of another shift register with digitized signal of the second quadrature and the register with locally generated PRN code providing a second quadrature result.

The correlator outputs are fed to quadrature multipliers. Four quadrature multipliers from a first set perform multiplication of their input for each quadrature by $2^N$, where N—a non-negative integer, thus applying multiplication of $\{I_1, Q_1\}$, $\{I_2, Q_2\}$, $\{I_3, Q_3\}$, $\{I_4, Q_4\}$ by individually configurable weights $m_1$, $m_2$, $m_3$ and $m_4$ (hereafter $m_k$). Quadrature outputs of the four correlators are respectively connected to multipliers with same k in the first set. Other quadrature multipliers being grouped in a second set in at least three group with four multiplier in each group, multipliers within each group numbered by an index k, perform zero multiplication of their input for each quadrature. These multipliers apply individually configurable weights $z^P_k$, P=1 though at least 3. Input of each multiplier in the second set is connected to the output of multiplier in the first set with same k.

The outputs of the multipliers from each group P are connected to a quadrature summer, each summer has four inputs, numbered by k, so that output of multiplier k from set P is connected to input k of quadrature summer P. The quadrature output of the quadrature summer P corresponds to $I^P_{1\_4}$, $Q^P_{1\_4}$.

To implement the four correlators, quadrature summers and to perform other needed operations, the proposed apparatus comprises:

a PRN chip generator, the output of which is connected to the shift register L-bit long, the output of each bit storage element in the shift register being connected (in parallel) to the input of the bit storage element with an identical number in a non-shifted register C with length L bit;

a first and second shift registers R1 and R2 of L-bit long of input quadratures;

a first and second accumulators that perform integrate and dump operation;

a mixer moving the input signal to zero-frequency, the input of which is the input of the whole apparatus, a first quadrature output of which is connected to the input of the first accumulator, and a second quadrature output—to the input of the second accumulator;

a first re-quantizer and a second re-quantizer, which re-quantize multi-digit numbers into a number with digit capacity smaller than the input capacity, but no less than 2 bits, the input of the units being connected to the outputs of one of accumulators, the first re-quantizer being connected to the first accumulator, and the second one—to the second accumulator;

a first conversion unit and a second conversion unit to convert the multi-bit parallel data input into a serial 1-bit data output at active state of the control input of the unit, the converters repeating one of input data bits at the data output at the inactive control input, multi-digit data inputs of which are connected to the outputs of the first and second re-quantizers respectively, and the data outputs are connected to the inputs of the first and second shift registers R1 and R2;

first four sets of XOR (exclusive OR) elements numbered as $XOR_{1ki}$, where k=1 . . . 4, kth element hereafter corresponds to $k^{th}$ correlator, wherein the first input of each XOR element is connected to the output of one bit storage elements in the non-shifted register C, and the second input of each XOR element is connected to the output of one bit storage elements in the shift register R1 of the first quadrature;

second four sets of XOR elements numbered as $XOR_{2ki}$ where k=1 . . . 4, wherein the first input of each XOR element is connected to the output of one bit storage elements in the non-shifted register C, and the second input of each XOR element is connected to the output of one bit storage elements in the shift register R2 of the second quadrature;

first four summers $Sum_{1k}$ with one-bit inputs, the outputs of elements $XOR_{1ki}$ with the same number k being connected to the inputs of the summer with number k, where k=1 . . . 4;

second four summers $Sum_{2k}$ with one-bit inputs, the outputs of elements $XOR_{2ki}$ with the same number k being connected to the inputs of the summer with number k, where k=1 . . . 4;

Outputs of the summers $Sum_{1k}$ correspond to first quadrature outputs of the four correlators, and outputs of the summers $Sum_{2k}$ correspond to second quadrature outputs of the four correlators.

Elements $XOR_{1ki}$ of the first four sets, non-shifted register C, and shift register R1 are connected as follows: the first input of $XOR_{1ki}$ is connected to the output of a bit storage element in the non-shifter register C with number Ind=(i−1)*4+k, the second input of the same element XOR is connected to the output of a bit storage element in the shift register R1 with number Ind=(i−1)*4+k, where k=1 . . . 4, and (i−1)*4+k lies in the range 1 . . . L. Elements $XOR_{2ki}$ of the second four sets, non-shifted register C, and shift register R2 are connected as follows: the first input of $XOR_{2ki}$ is connected to the output of a bit storage element in the non-shifter register C with number Ind=(i−1)*4+k, the second input of the same element XOR is connected to the output of a bit storage element in the shift register R2 with number Ind=(i−1)*4+k, where k=1 . . . 4, and (i−1)*4+k lies in the range 1 . . . L.

Figure 5A:
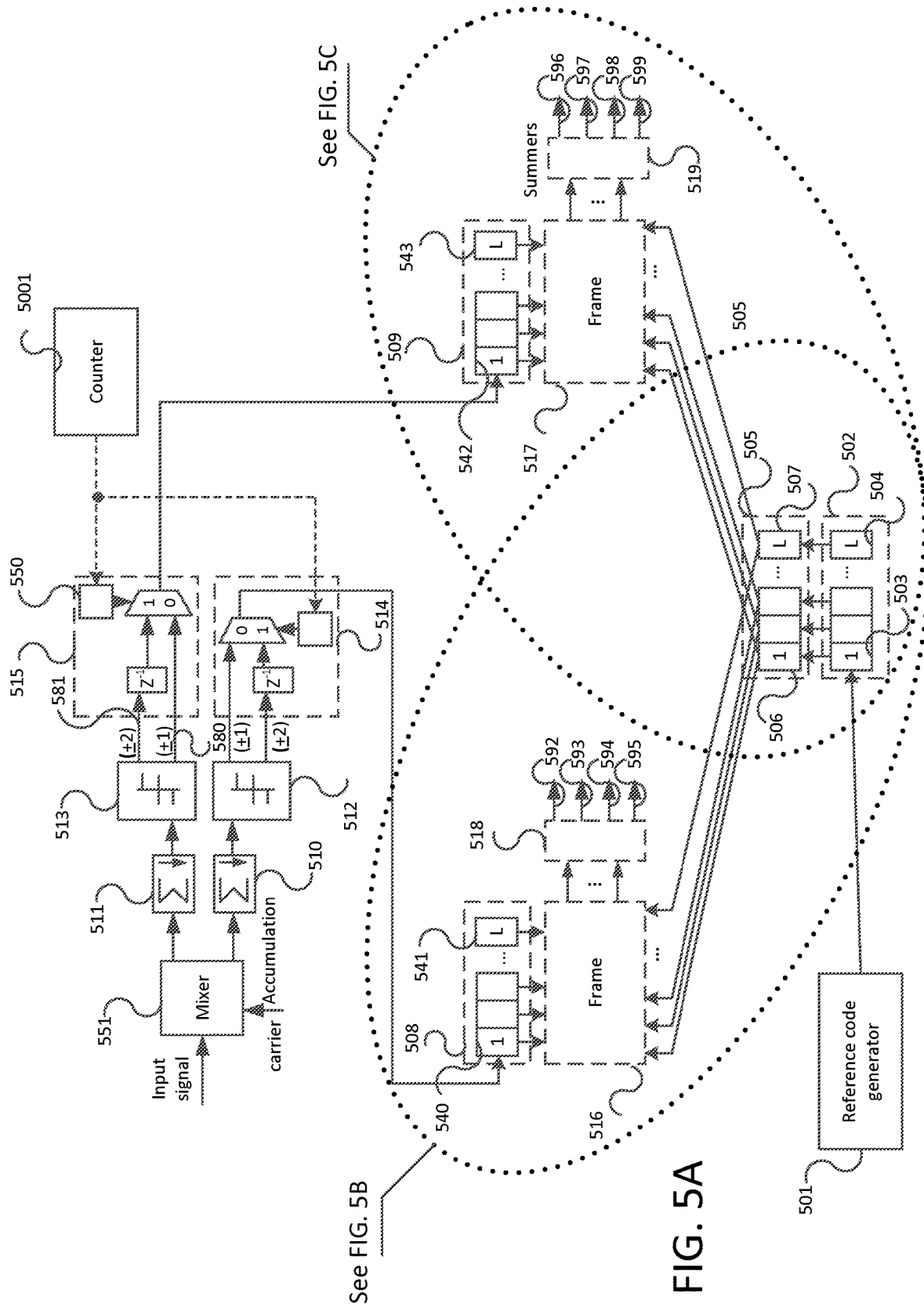
FIGS. 5A-5C illustrate parts of an apparatus to calculate $I_1Q_1$, $I_2Q_2$, $I_3Q_3$, $I_4Q_4$ convolutions.
Figure 5B:
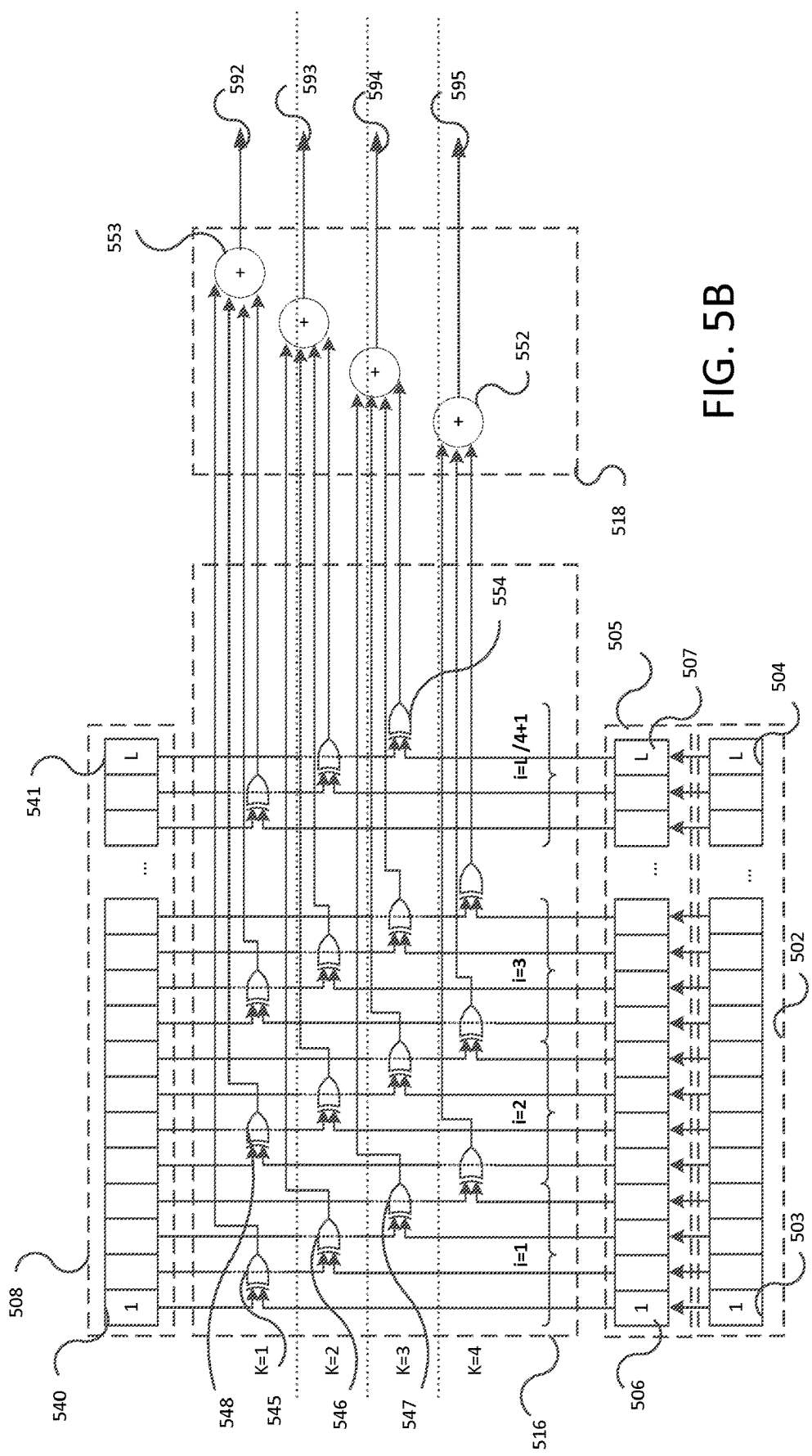
Figure 5C:
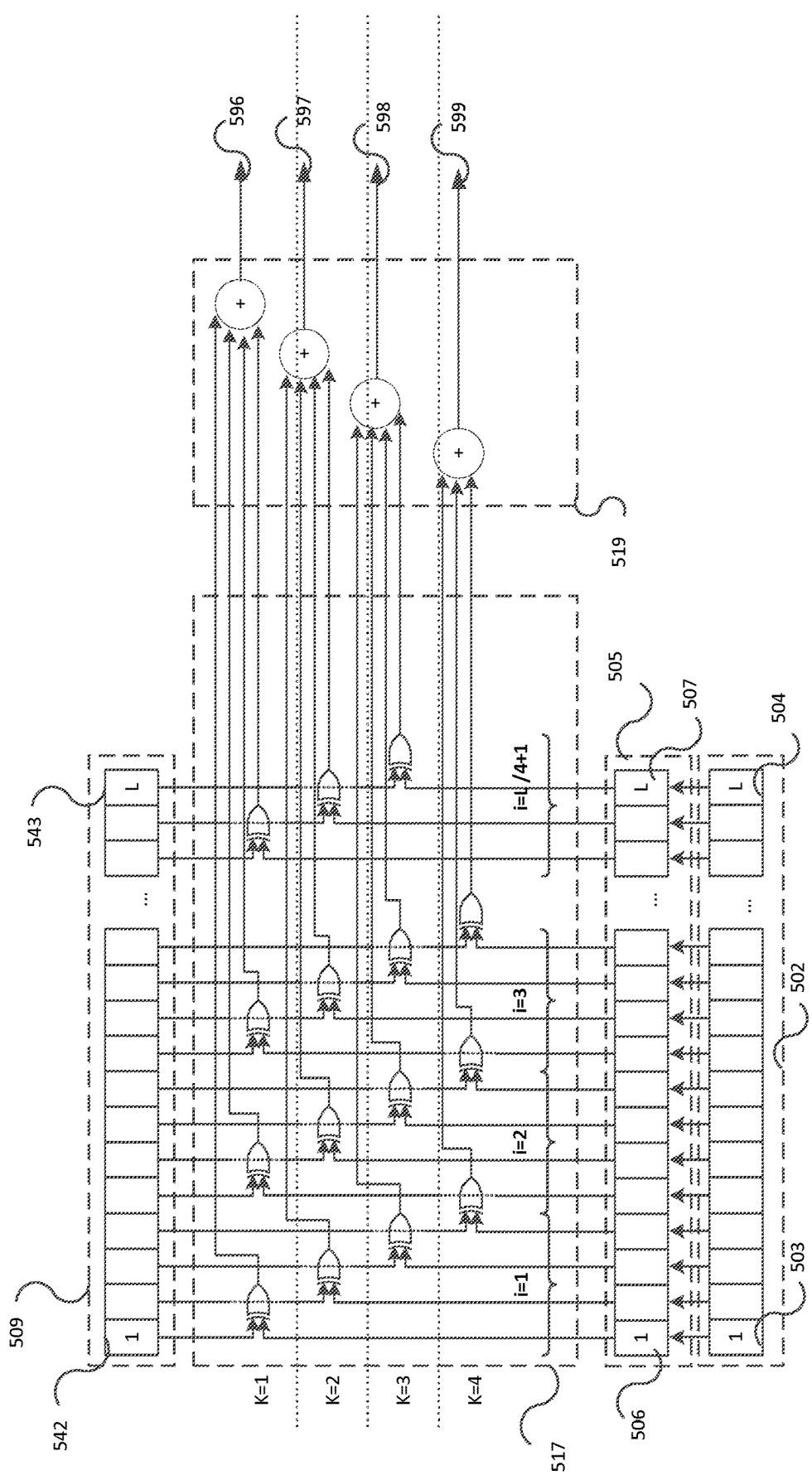

FIGS. 5A-5C (which should be viewed as a single figure) shows these components, with number 501 indicating the PRN chip generator, 502—the L-bit shift register of the reference signal, 505—a non-shifter register C, 508 and 509—a first and a second shift register R1 and R2, 510 and 511—the first and second accumulators, 551—the mixer, 512 and 513—the first and second quantizers converting in this embodiment of the invention a multi-digit number into 2-bit number, 514 and 515—the first and second converters of the multi-bit parallel data input (in this embodiment—2-bit) into serial 1-bit data output. The first four sets of XOR elements are combined in FIG. 5 by frame 516, here, 545 designates $XOR_{111}$, 546—$XOR_{121}$, 547—$XOR_{131}$, 548—$XOR_{112}$. The second four sets of XOR elements are combined in FIGS. 5A-5C by frame 517. The first four summers $Sum_{1k}$ are combined in FIGS. 5A-5C by frame 518, summer $Sum_{11}$ is designated as 553, and $Sum_{14}$—as 552.

FIGS. 5A-5C present one of possible implementations intended for receiving QZSS L6 signal with L=1023, in particular. Referring to these figures, the output of reference signal storage with index 1 (designated as 503) in shift register 502 is connected to the input of reference signal storage with index 1 (designated as 506) in non-shifted register 505, the output of element 506 being connected to one of inputs of $XOR_{111}$ designated by 545. The other input of this XOR is connected to the output of bit storage element of the first quadrature with index 1 designated in the figure as 540. And the output of the reference signal storage element with index L (designated as 504) in shift register 502 is connected to the input of the reference signal storage element with index L (designated as 507) of non-shifter register 505, the output of element 507 being connected to one of inputs of $XOR_{13(L/4+1)}$ with number 554. The indices of this XOR (k=3, i=L/4+1) follow from the above connection scheme: Ind=L=(i−1)*4+k, for L=1023, k=3 and i=256. The other input of this XOR is connected to the output of bit storage element of the first quadrature with index L designated as 541.

The components included in the apparatus, namely, non-shifted register C (505), shift register R1 (508), first four sets of elements XOR (516), and summers $Sum_{1k}$ (518) implement four convolutions for one quadrature. A result of the first convolution of the first quadrature is value $I_1$ designated by arrow 592, a result of the second convolution of the first quadrature is value $I_2$ designated by arrow 593. Similarly, results of the third and fourth convolutions are $I_3$ and $I_4$ designated by 594 and 595 respectively. Non-shifter register C (505), shift register R2 (509), second four sets of elements XOR (517), and summers $Sum_{2k}$ (519) implement four convolutions for another signal quadrature $Q_1$, $Q_2$, $Q_3$, $Q_4$ designated by 596, 597, 598, 599 in FIG. 5.

In some embodiments the first and second sets of quadrature multipliers, the quadrature summers and a control logic around them comprise the following components:

first four multipliers by 2 being referred to as to $Mul2_{1k}$ multiplying by 2 the non-control input if state of the first control input is active, and by 1 in inactive state, to non-control inputs of which the outputs of four summers $Sum_{1k}$ are connected;

second four multipliers by 2 being referred to as to $Mul2_{2k}$ multiplying by 2 the non-control input if state of the first control input is active, and by 1 in inactive state, to non-control inputs of which the outputs of second four summers $Sum_{2k}$ are connected;

a 4-bit shift register RMult2 with function of rotating to the right, the outputs of storage elements with number k in the register being connected to the first control inputs $Mul2_{1k}$ and $Mul2_{2k}$ respectively, where an element with number 1 is LSB, and with number 4—MSB;

a 4-bit shift register RZero with function of rotating to the right, four zero-multipliers $Mul0_{1k}$ and four zero-multipliers $Mul0_{2k}$ multiplying by zero the non-control input in the active state of the control input, and by 1 in inactive state, the outputs of bit storage elements in register RZero with element number k (k=1 corresponds to LSB, K=4—to MSB) being connected to the control inputs of zero-multipliers $Mul0_{1k}$ and $Mul0_{2k}$, and the non-control inputs of multipliers $Mul0_{1k}$ being connected to the outputs of multipliers $Mul2_{1k}$, and the non-control inputs of multipliers $Mul0_{2k}$ being connected to the outputs of multipliers $Mul2_{2k}$;

summers Sum1 and Sum2 with four multi-digit inputs, to inputs of which the outputs of zero-multipliers $Mul0_{1k}$ and $Mul0_{2k}$ are respectively connected;

When each of the shift registers is shifted, the shifted out LSB is carried to the MSB.

Note that register RMult2 is functionally identical to the register $M^1$ described above, with bits $m^1_1$, $m^1_2$, $m^1_3$, $m^1_4$.

In some embodiments, multipliers $Mul2_{1k}$ and $Mul2_{2k}$ have the second control input. When it is active, multiplication by 4 is produced instead of multiplying by 2, the unit comprises a 4-bit register RMult4 with function of rotating to the right and bit numbering as in RMult2, the outputs of bit storage elements with number k in the register being connected to the second control inputs $Mul2_{1k}$ and $Mul2_{2k}$ respectively. Note that register RMult4 is identical in functionality to the register $M^2$ described above.

Figure 6:
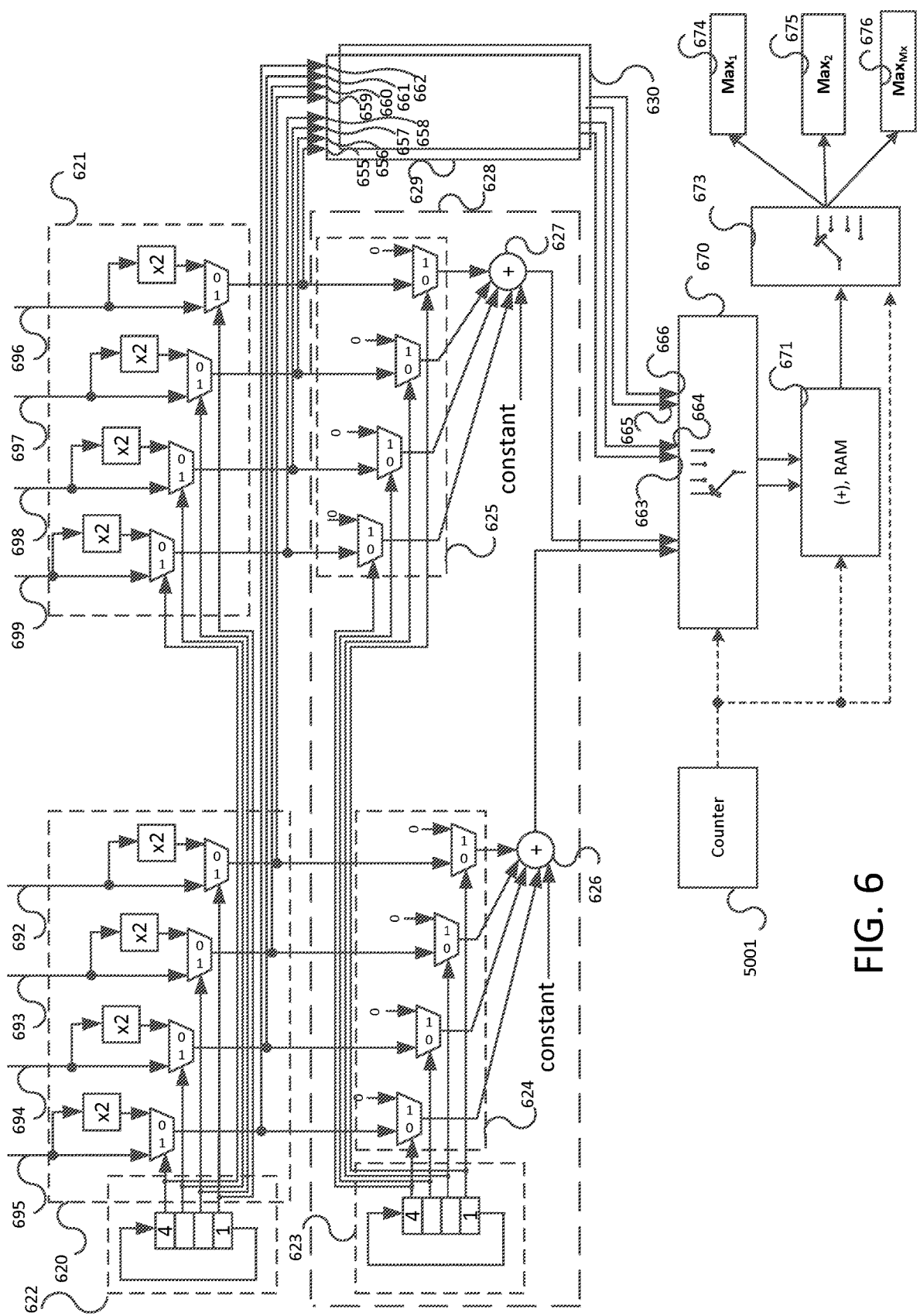
FIG. 6 illustrates part of the apparatus to calculate $I^P{}_{1\_4}$ and $Q^P{}_{1\_4}$ for P=1 . . . 3 and search maximums.

FIG. 6 shows these components, where the first four multipliers $Mul2_{1k}$ are combined by frame 620, second four multipliers $Mul2_{2k}$—by frame 621, 622 designates register RMult2, 623—register RZero, 626 and 627 designate summers Sum1 and Sum2. Inputs 692 . . . 699 correspond to inputs 592 . . . 599 in FIGS. 5A-5C, i.e., input 692 is $I_1$, and input 699—$Q_4$, respectively.

In some embodiments, elements grouped by frame 628 provide $I^1_{1-4}$ and $Q^1_{1-4}$ from results of above described convolutions $I_1$, $I_2$, $I_3$, $I_4$ for one quadrature and $Q_1$, $Q_2$, $Q_3$, $Q_4$ for another quadrature; these values are possible Prompt results or (for example, in Embodiment C) possible Early/Late of the first multiplexed signal.

In some embodiments the apparatus also includes:

a 4-bit register RZeroAlt with function of rotating to the right and bit numbering as in RMult2, four zero-multipliers $Mul0Alt_{1k}$, four zero-multipliers $Mul0Alt2_{1k}$, four zero-multipliers $Mul0Alt_{2k}$, four zero-multipliers $Mul0Alt2_{2k}$ multiplying by zero the numbers at the non-control input at active state of the control input and by 1 in inactive state, the outputs of bit storage elements in register RZeroAlt with element number k being connected to the control inputs of zero-multipliers in $Mul0Alt_{1k}$ and $Mul0Alt_{2k}$ and connected to control inputs of zero-multipliers $Mul0Alt2_{1k}$ and $Mul0Alt2_{2k}$ via invertors, the non-control inputs of multipliers $Mul0Alt_{1k}$ and $Mul0Alt2_{1k}$ being connected to the outputs of multipliers $Mul2_{1k}$, while the non-control inputs of multipliers $Mul0Alt_{2k}$ and $Mul0Alt2_{2k}$—to the outputs of multipliers $Mul2_{2k}$;

summers SumAlt1 and SumAlt2 with four multi-digit inputs in each unit, to the inputs of which the outputs of zero-multipliers Mul0Alt$_{1k}$ and Mul0Alt$_{2k}$ are connected, respectively;

summers SumAlt21 and SumAlt22 with four multi-digit inputs in each unit, to the inputs of which the outputs of zero-multipliers Mul0Alt2$_{1k}$ and Mul0Alt2$_{2k}$ are connected, respectively.

Figure 7:
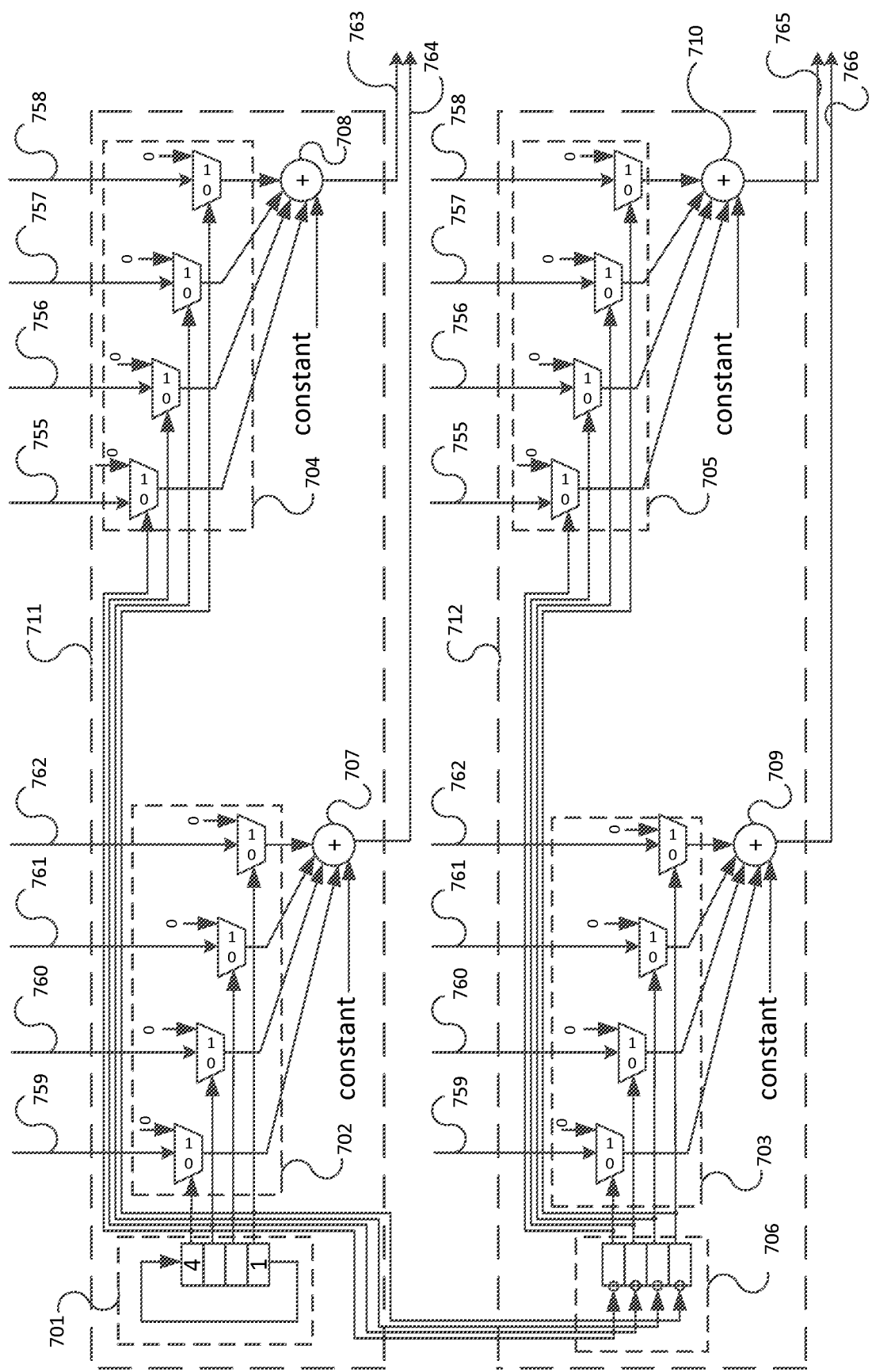
FIG. 7 illustrates part of the apparatus to calculate $I^4{}_{1\_4}$ and $Q^4{}_{1\_4}$.

The elements of the apparatus are illustrated in FIG. 7, wherein four zero-multipliers Mul0Alt$_{1k}$ are grouped by frame 702, four zero-multipliers Mul0Alt2$_{1k}$ are grouped by frame 703, four zero-multipliers Mul0Alt$_{2k}$ are grouped by frame 704, four zero-multipliers Mul0Alt2$_{2k}$ are grouped by frame 705. Number 701 designates register RZeroAlt, 706—output inverters of register 701, 707—summer SumAlt1, 708—summer SumAlt2, 709—summer SumAlt21, 710—summer SumAlt22. Elements combined by frame 711 correspond to unit 629 in FIG. 6. Similarly, unit 630 in FIG. 6 corresponds to elements grouped by frame 712 in FIG. 7. Outputs 655 . . . 662 of FIG. 6 correspond to inputs 755 . . . 762 in the increasing order of indices in FIG. 7.

From FIG. 7, inputs 755 . . . 762 are common for the elements inside frame 711 and similar elements inside frame 712. Outputs 763 and 764 in FIG. 7 correspond to outputs 663 and 664 in unit 629 of FIG. 6. In the same way, outputs 765 and 766 in FIG. 7 correspond to outputs 665 and 666 in unit 630 in FIG. 6.

In some embodiments, elements grouped by frame 711 in FIG. 7 respectively provide $I^2_{1\_4}$ and $Q^2_{1\_4}$ from results of above described convolutions $I_1$, $I_2$, $I_3$, $I_4$ and $Q_1$, $Q_2$, $Q_3$, $Q_4$; these values are possible Late results (for example, in Embodiment A or in Embodiment B). Elements grouped by frame 712 in FIG. 7 provide $I^3_{1\_4}$ and $Q^3_{1\_4}$; these values are possible Late results in Embodiment A. In another embodiment, elements grouped by frame 711 in FIG. 7, provide $I^4_{1\_4}$ и $Q^4_{1\_4}$ that are possible Prompt or Early/Late of the second multiplexed CSK signal.

In one more embodiment, constants are additionally fed to summers Sum1, Sum2, SumAlt1, SumAlt2, SumAlt21 and SumAlt22, the constants compensating for a biased result of multiplication coded +1 and −1 in elements XOR (it corresponds to constants C1, C2, C3, C4 in expressions 1 and 2). In another embodiment of the invention, the difference between full multiplication of +/−1 and multiplication in elements XOR, equivalent to single-digit addition of 0 and/or 1, is compensated after obtaining final values of potential Prompt, Early and Late.

The proposed apparatus also comprises a random access memory (RAM) to store L complex multi-digit values. The RAM has a function of adding a value to a selected stored element at its input, the input of this unit being connected to the outputs of summers Sum1, Sum2, SumAlt1, SumAlt2, SumAlt21, SumAlt22 via a first commutator. The connections in the first commutator are as follows: the first output of the commutator switches the outputs from Sum1, SumAlt1, SumAlt21 that are fed to the commutator inputs, similarly the second output of the commutator switches the outputs from Sum2, SumAlt2, SumAlt22. The commutator outputs are respectively connected to the first and second inputs of the RAM and are considered as two components of complex values. Some embodiments include a counter incremented after each shift in shift registers R1 and R2, the output of this counter being connected to the control input of the first commutator, and the number in this counter by modulo L determining the number of the modified element in the memory, while its number by modulo 4 (value of the counter's two low-significant bits) determining the output of which summers needs to be passed by the first commutator and thereby finally added to the current value of the selected memory element.

In some embodiments the random access memory (RAM) is absent. For those embodiments, Nconv=1 is assumed, which means that the correlators' outputs form full results, whereas the RAM is needed to gather full results from partial results at the correlators' outputs.

FIG. 6 shows the elements of the apparatus, wherein number 670 designates the first commutator, 671—the RAM for L complex multi-digit numbers with a function of adding a value to a selected stored element at its input, 5001—the counter being incremented after each shift in shift registers R1 and R2. FIGS. 5A-5C and 8 also show this counter indicated by 5001. Commutator 670 switches its outputs connected to the inputs of unit 671, so that they commute outputs to inputs 663 and 664, or to inputs 665 and 666, or to inputs being the outputs of summers 626 and 627. This commutator can be implemented as a logic unit selecting an input according to two low-significant bits of counter 5001 fed to the control input of the commutator. The address according to which unit 671 addresses to memory is determined by the numbers in the high bits.

Counter 5001 can be implemented as a summer with reset when value L is achieved. Values outputted by the counter are clock numbers 1' described above.

Converters of parallel data into serial data 514 and 515 in some embodiments contain special logic designated by number 550 for converter 515 in FIGS. 5A-5C. For one operation mode at zero low-significant bits at the output of counter 5001, this logic commutes input 580 with the output connected to 509, but at non-zero value in the low-significant bits of the counter it commutes with input 581 delayed by a clock. In another operation mode logic unit 550 always commutes input 580 with the output. Converters 514 and 515 converting parallel data into serial in some embodiments have a special control input to select one of two described operation modes.

In another embodiment, the first commutator has a second control input with the help of which one of some commutation rules for the RAM can be chosen, when one rule is selected, the outputs of summers Sum1, Sum2 are always connected to the RAM, when another rule is selected, the outputs of summers SumAlt1, SumAlt2, or the outputs of summers SumAlt21, SumAlt22, or zero are commuted depending on the value of two low bits of the counter; when one more rule is selected, the outputs of summers Sum1, Sum2, or the outputs of summers SumAlt1, SumAlt2 are commuted.

For some embodiments, commutated outputs of summers Sum1, SumAlt1 and SumAlt21 are added to the content of one component of the complex number stored in memory, and commutated outputs of summers Sum2, SumAlt2 and SumAlt22 are added to the other component of the complex number stored in memory.

The stored data is conveyed to RAM output, the first and second components correspond to the first and second quadratures.

Finally, the apparatus comprises a circuit that implements:
at least three searchers (namely: first, second and third) of maximum of data being stored in the RAM as one of the stored components;
identification of the searched maximum;
selection of an additional data being stored in the RAM to be fed to the CSK signal Delay Locked Loop (DLL).

Each searcher includes registers to conditionally hold input values and a logic to check a condition for hold.

In some embodiment each searcher receives each component of the memory stored data via a separate input, the hold condition includes at least comparison of a first input with a register associated with the first input and becomes true if the input value is greater than the hold value, wherein the RAM output is fed to the searchers. In some embodiments the first input is fed by the first component of the stored memory data that corresponds to first quadrature, in another embodiment the first input is fed by a sum of squared first and second quadratures or by amplitude of the two quadratures, i.e., of the first quadrature+i*second quadrature.

In some embodiments the first input of each searcher is fed by a quadrature estimator that receives the output of the RAM or of the first commutator of one of the four correlators and performs one of the operations listed above, that is, outputs either the first quadrature, or the sum of squared first and second quadratures or an amplitude of the two quadratures.

In some embodiments the hold values in the first searcher correspond to the quadratures and a code shift of a received symbol of a first chip-by-chip multiplexed CSK signal in a Prompt position, hold values in the second and the third searchers correspond to quadratures of the symbol in Early and Late positions to be fed to a CSK signal DLL. In some embodiments the apparatus also includes $4^{th}$, $5^{th}$ and $6^{th}$ searchers that hold quadratures in Prompt, Early and Late positions of a received symbol of a second chip-by-chip multiplexed CSK signal.

In some embodiments, the circuit is implemented as a processor. In some embodiments, the RAM output is connected to the processor. In another embodiment, the output of the RAM is connected through a second commutator to inputs of the searchers (see 674, 675, 676). The searcher outputs are connected to the processor.

In FIG. 6 the second commutator is designated by 673, numbers 674, 675 and 676 designate the maximum searchers.

In some embodiments the second commutator, as well as the first one, have the control input to select commutation rules.

Figure 8:
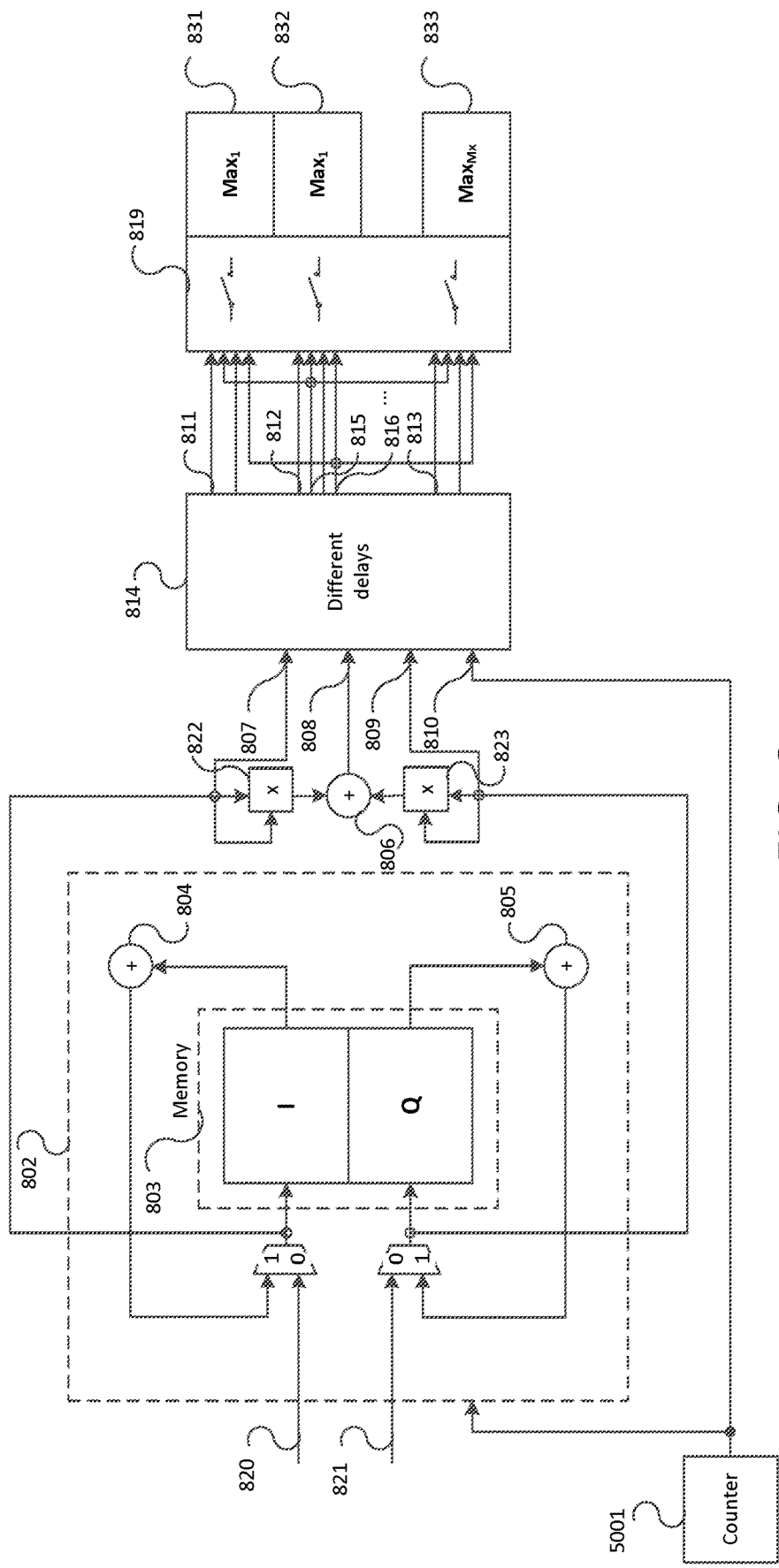
FIG. 8 illustrates additional elements for the search of maximums.

In some embodiments, the second commutator of the output of the RAM with inputs of the searchers combines results of some memory elements, some values are modified, an additional delay is entered. In some embodiments, the second commutator conditionally replaces first input of the second and the third searchers with a delayed first input of the first searcher, thus forcing the second and third searchers to hold jointly other inputs in accordance with the hold in the first searcher. An example of such an embodiment is shown in FIG. 8. To one input of a memory containing unit 802 from the output of the first commutator there is a fed result $I^P_{1\_4}$ designated by 820, and $Q^P_{1\_4}$ designated by 821 is fed to the second input, memory 803 is requested for a value according to counter 5001, component I stored in memory at the given address is added in summer 804, and component Q—in summer 805, then, depending on whether reference signal elements have been at least once updated, either the sums or bare values of the input are stored at the same address in memory.

The saved values are transmitted to the outputs of the RAM. These values are fed, in particular, to the inputs of square units 822 and 823, the outputs of which are connected to summer 806. As a result, at the output of summer 806 there is generated an additional value—complex signal power. This power is fed to input 808 of an additional delay generator 814. The value I saved in the memory is fed to input 807 of the generator, value Q—to input 809, and counter's state is fed to input 810. The four inputs in the additional delay generator are delayed for different clock numbers. The delayed inputs are transmitted to the outputs. For example, input 807 delayed by a first constant is transmitted to output 811, the same output but delayed by a second constant is transmitted to output 812, the same output but delayed by the third constant is transmitted to output 813. Similarly, outputs corresponding to input 809 are generated.

Note that outputs corresponding to input 808 (signal power) and 810 (counter state) for the first and third delays are substituted by the outputs of these signals for the second delay. Considering this substitution, the above outputs are fed to the inputs of commutator 819. Inputs corresponding to different delays in commutator 819 are connected or not connected to maximum units 831, 832 and 833. If they are connected, maximum units compare the power fed to them with current maximal power and if it is exceeded the stored values associated with the current maximal power are replaced by new ones.

In some embodiments, inputs 807, 808, 809, 810 delayed in the second value correspond to possible Prompt at the moment of connecting with maximum unit 832, the same inputs delayed in the first value contain Early value corresponding to the possible Prompt value at the moment of connecting with maximum unit 831, and the inputs delayed in the third value contain Late value corresponding to the possible Prompt at the moment of connecting with maximum unit 833. Since power value being checked for maximum and fed to the three maximum units is the same, and corresponds to the power of possible Prompt, and since the fed counter state is the same as well, all the three maximums cause updating of stored Prompt, Early and Late at the same time.

In some embodiments of this invention the control inputs of the parallel-to-serial converters, the second control input of the first commutator and control input of the second commutator are connected to the processor. The inputs of registers RMult2, RZero, RZeroAlt, and the outputs of the proposed apparatus are also connected to the processor.

In some embodiments the searchers can be joined in a unit that selects several maximums of the quadrature results when a non-CSK signal is received. Therefore the searchers are fully utilized both when CSK signal is received and when a non-CSK signal is received and the apparatus is configured to search a delay of the non-CSK satellite signal.

Figure 9:
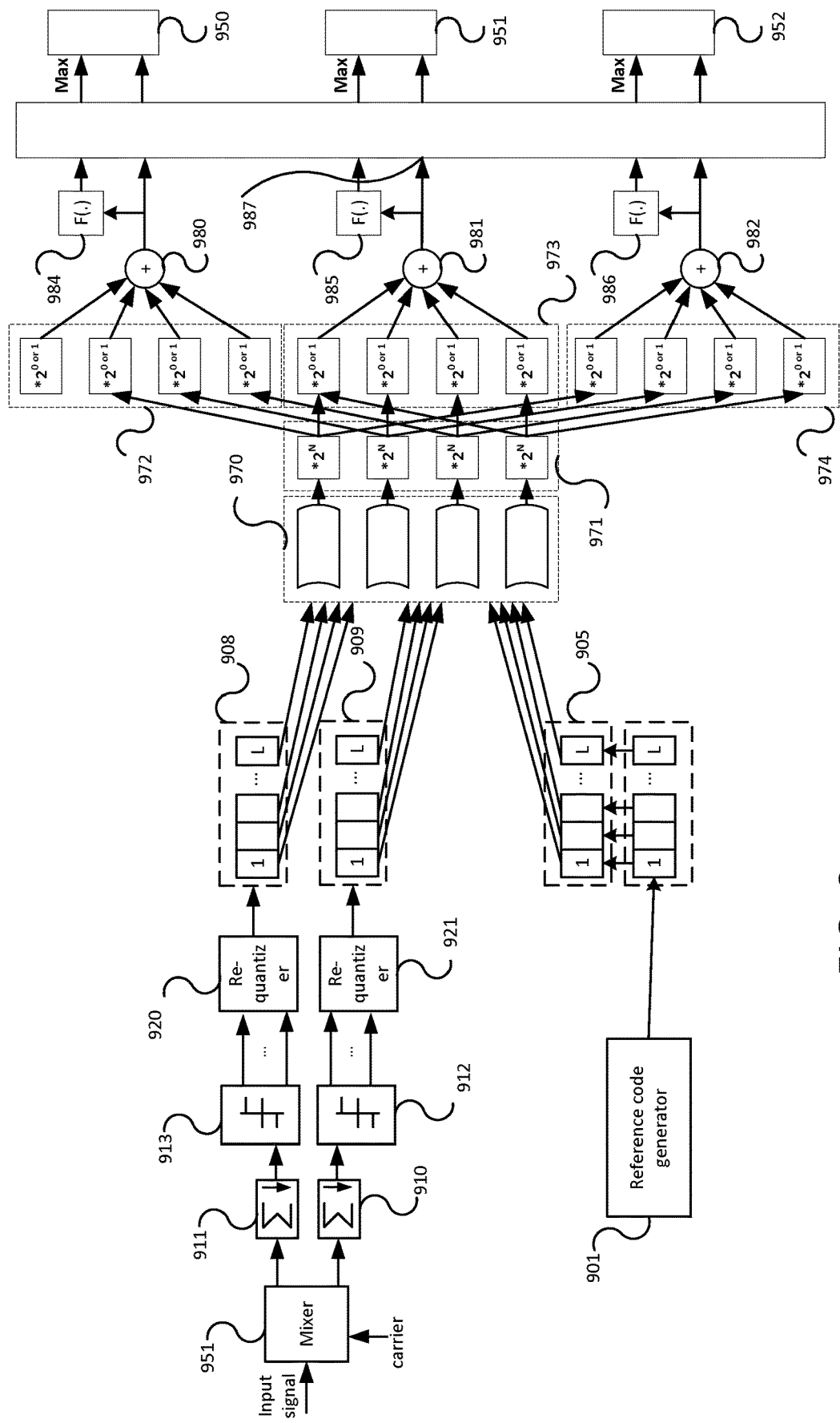
FIG. 9 illustrates overall structure of the apparatus.

An overall structure of the apparatus is illustrated in FIG. 9. Similarly to FIG. 5A, the apparatus includes 901—the PRN chip generator, 905—the non-shifter register C storing PRN code, 908 and 909—the first and the second shift register R1 and R2, 910 and 911—the first and second accumulators, 951—the mixer, 912 and 913—the first and second re-quantizers, 920 and 921—the first and second converters of the multi-bit parallel data input into serial 1-bit data output. The registers 905, 908 and 909 are connected to the four correlators 970 that convolve each fourth element from the registers R1, R2 and C. The correlators' outputs are connected to the first set of four quadrature multipliers 971 that multiply input by $2^N$, where the individually configurable parameter N of each multiplier is controlled separately. For embodiments with N switched between 1 and 2, the control logic can be implemented as a 4-bit register. The multipliers' outputs are connected to the second set of three groups (972, 973 and 974) of quadrature multipliers that multiply by 0 or 1. Individually configurable parameters of the multipliers are controlled by separate means, such as three other 4-bit registers. Outputs of the multipliers are connected to the quadrature summers 980, 981 and 982. Outputs of the summers and outputs of the quadrature estimators 984, 985 and 986 are connected to the logic block 987 that conditionally delays outputs of the quadrature summers and the quadrature estimators and forms first, second and third groups of conditionally delayed outputs. In some embodiments the logic block 987 also can include the RAM and the first and second commutators. Typically, in these embodiments the register 905 is periodically updated via an intermediate shift register and the 4-bit registers that control multipliers in the first and the second set are implemented as shift registers with rotation from LSB to MSB or from MSB to LSB. Finally, all the results are fed to the searchers 950, 951 and 952 that receive at the first inputs the conditionally delayed outputs of the quadrature estimators.

It should be noted that FIG. 9 depicts only an apparatus or a part of the apparatus that corresponds to reception of only the first chip-by-chip multiplexed CSK signal. To receive both chip-by-chip multiplexed CSK signals, at least one additional group of quadrature multipliers in the second set, at least one additional quadrature summer, at least one additional 4-bit register and a number of additional searchers are included.

In embodiment A when QZSS L6 is received, the initial value in register RMult2=0101b, in register RZero=0000b, in register RZeroAlt=1001b, where "b" at the end means binary form.

In embodiment B when QZSS L6 is received, the initial value in register RMult2=1100b, RMult4=0100b, in register RZero=0010b, in register RZeroAlt=1101b.

In embodiment C when QZSS L6 is received, the initial value in register RMult2=0101b, in register RZero=1001b, in register RZeroAlt=0110b.

In some embodiments when non CSK signal is received, for example, GPS L1 CA, the initial value in register RMult2=0000b, in register RZero=0000b, in register RZeroAlt=0000b.

The proposed invention covers implementations in the form of ASIC or FPGA, although other implementations (such as using discrete components or processor-and-software-based implementations) are also contemplated. A typical embodiment of the apparatus described herein is a module added to a GNSS receiver, where the module can be implemented as an ASIC or an FPGA, although some or all of the functionality could be performed by the processor of the receiver, if the processor is powerful enough, for example.

Having thus described the different embodiments of a system and method, it should be apparent to those skilled in the art that certain advantages of the described method and apparatus have been achieved.

REFERENCES (ALL INCORPORATED HEREIN BY REFERENCE IN THEIR ENTIRETY)

[1] Axel Javier Garcia Pena, Daniel Salos, Olivier Julien, Lionel Ries, Thomas Grelier. "Analysis of the use of CSK for Future GNSS Signals". hal-enac.archives-ouvertes.fr/hal-00936952, Submitted on 7 Feb. 2014
[2] U.S. Pat. No. 4,707,839 A.
[3] EP 0668663 A1.
[4] U.S. Pat. No. 5,146,471 A.
[5] "Decision-Directed Coherent Delay-Lock Tracking Loop for DS-Spread-Spectrum Signals", IEEE Trans. on Communications, vol. 39, No. 5, May 1991, pp. 758-765, pdfs.semanticscholar.org/4162/56d775103c01a12d-613c0c1866ac9eb2ccce.pdf.
[6] U.S. patent application Ser. No. 15/549,209, filed on Aug. 7, 2017, entitled METHOD AND SYSTEM FOR DEMODULATING AND TRACKING OF CSK-MODULATED SIGNALS, now U.S. Pat. No. 10,488,525, issued on Nov. 26, 2019.
[7] Kurt H. Mueller and Markus Muller. "Timing Recovery in Digital Synchronous Data Receivers". IEEE Transactions on Communications, vol. COM-24, pp. 516-531, 1976.

What is claimed is:

1. A method of receiving two chip-by-chip multiplexed CSK signals, the method comprising:
for a CSK symbol, obtaining a first quadrature and a second quadrature of a moved-to-zero-frequency signal, and integrating both quadratures;
representing the integrated quadratures as $\Sigma_{j=0}^{D} 2^{j} * x_j$, where $x_j=+/-1$ and each integrated quadrature is adjusted to nearest $\{-2*2^D+1, -2*2^D+3, \ldots, -1, +1, \ldots, +2*2^D-3, +2*2^D-1\}$, where D is an integer>0;
shifting $x_j$ calculated for the first quadrature through a first delay line, and $x_j$ calculated for the second quadrature in a second delay line, such that $x_j$ becomes first element of the delay line;
calculating four convolutions of each delay line with a reference signal, each convolution multiplying each fourth element from the delay line and the reference signal, where each element from the delay line is used in only one of the four convolutions;
using the four convolutions to calculate a predicted Prompt; and
demodulating the CSK symbol using the predicted Prompt and previously calculated predicted Prompts.

2. The method of claim 1, wherein the obtaining step is performed over a chip duration interval divided by K, where K=1 or 2, and
wherein
when K=1, the shifting is done after each integration,
when K=2, the shifting is done after each of two consecutive integrations, and no shifting is done after two alternate consecutive integrations.

3. The method of claim 1, wherein the representing step first normalizes and rounds the integrated quadratures.

4. The method of claim 1, wherein the using step also calculates a predicted Early, and a predicted Late, and the demodulating step also includes using the predicted Early and previously calculated predicted Earlies and the predicted Late and previously calculated predicted Lates.

5. The method of claim 4, wherein to calculate the predicted Prompt, Early and Late, the four convolutions are multiplied by $2^j$, wherein j for each convolution is the index j of $x_j$ that were shifted to a fourth element of the delay line; and
the four convolutions are multiplied by a pre-set weight 0 or 1 for each convolution from a first set of weights and then summed to obtain the predicted Prompt,
the four convolutions are multiplied by a pre-set weight 0 or 1 from a second set of weights, then summed to obtain the predicted Early,
the four convolutions are multiplied by pre-set weight 0 or 1 from a third set of weights, then summed to obtain the predicted Late.

6. The method of claim 5, wherein the calculating of the four convolutions is based on a rule: a convolution with number P (P=1, 2, 3, 4) is equal to the sum of multiplication products of each fourth element of the delay line by each fourth element of the reference signal, where the first convolution element of the delay line and of the reference signal being elements with index P, wherein element with index P=1 is the first element in the delay line.

7. The method of claim 1, wherein D is different for different integration intervals.

8. The method of claim 1, wherein the obtaining step is performed over a chip duration interval divided by K, where K=1 or 2, and
wherein
when K=1, the shifting is done after each integration,
when K=2, the shifting is done after each of two consecutive integrations, and no shifting is done after two alternate consecutive integrations,
wherein the representing step first normalizes and rounds the integrated quadratures, and
wherein at K=1, D for successive integration intervals alternatively changes according to: a first interval with D=2, a second interval with D=0, a third interval with D=2, a fourth interval with D=0 and so on, and wherein the normalizing and rounding of the integrated quadratures is done to a nearest number from a set $\{-7, -5, -3, -1, +1, +3, +5, +7\}$, and the normalizing and rounding of the integrated quadratures for intervals with D=0 is done to a nearest number from a set $\{-1, +1\}$.

9. The method of claim 1, wherein D=1 for all integration intervals, wherein the representing step first normalizes and rounds the integrated quadratures, and the normalizing and rounding of the integrated quadratures is done to a nearest number from a set $\{-3, -1, +1, +3\}$.

10. The method of claim 1, wherein a code shift for the CSK symbol is determined based on either a maximum of a sum of quadrature squares from all the predicted Prompts or a maximum of one quadrature of all the predicted Prompts, taking the most positive value.

11. The method of claim 1, wherein the reference signal is a sequence of +1's and −1's, and wherein the reference signal represents the first chip-by-chip multiplexed CSK signal, each chip of the first chip-by-chip multiplexed CSK signal is represented as four equal consecutive elements.

12. An apparatus for receiving a CSK signal comprising:
a PRN code generator;
an L-bit shift register receiving an output of the PRN code generator;
a register C receiving a copy of the bits in the L-bit shift register;
a first shift register R1 and a second shift registers R2 of the L-bit shift register storing first and second quadratures of the CSK signal;
a mixer shifting the CSK signal to zero-frequency and outputting the first and second quadratures to first and second accumulators;
the first and second accumulators integrating the first and second quadratures and providing them in serial form to the registers R1 and R2, respectively;
Z correlators, each correlator receiving outputs of the registers R1 and R2, and outputting a correlation of the outputs of the register R1 and the register C as the first quadrature, and a correlation of the outputs of the register R2 and the register C as the second quadrature, Z being an integer power of 2 and not less than 4,
wherein each correlator uses every corresponding $Z^{th}$ bit in the registers R1, R2 and C for its correlation;
a first set of Z quadrature multipliers that multiply the first and second quadratures by $2^N$, N being non-negative integers individually configurable for each multiplier, a second set of quadrature multipliers grouped as groups of Z multipliers, that multiply the first and second quadratures by 0 or 1;
each of the Z correlators providing an input to corresponding quadrature multipliers in the first set;
outputs of the quadrature multipliers in the first set are provided to corresponding quadrature multipliers in the second set;
a first quadrature summer receiving inputs from multipliers in a first group of the second set and providing a sum of the inputs from the group;
a memory storing a plurality of correlation results such that an output of the first summer is added to the first and second quadratures of one correlation result in the memory, the first and second quadratures are replaced by a result of the addition, which is then outputted; and
a first searcher that finds a maximum of the first and second quadratures that corresponds to a code shift of a received symbol of a first chip-by-chip multiplexed CSK signal in a Prompt position of the CSK signal.

13. The apparatus of claim 12, further comprising first and second re-quantizers that reduce a number of bits used to represent the first and second quadratures from the first and second accumulators; and
first and second converters that convert the reduced-bit representation of the first and second re-quantizers into a serial format, and whose output is provided to the registers R1 and R2, respectively.

14. The apparatus of claim 12, further comprising three 4-bit shift registers with function of rotating to the right that configure the quadrature multipliers in the first and second sets, where each bit of the first register is connected to a configuration input of one of the Z quadrature multipliers in the first set, each bit of the second shift register is respectively connected to a configuration input of Z of the quadrature multipliers in the first group of the second set, each bit of the third register is respectively connected to a configuration input of the quadrature multipliers in the second group of the second set and connected, via an inverter, to a configuration input of the quadrature multipliers in the third group of the second set,
wherein the shift registers perform a shift in a direction from most significant bit (MSB) to least significant bit (LSB), and
wherein the shifted out LSB is carried to the MSB.

15. The apparatus of claim 12, wherein bits in the registers R1, R2 and C are interpreted as either −1 or +1.

16. An apparatus for receiving a CSK signal comprising:
a first shift register R1 and a second shift register R2 storing first and second quadratures of the CSK signal;
a mixer shifting the CSK signal to zero-frequency and outputting the first and second quadratures;
first and second accumulators integrating the first and second quadratures;
first and second converters that serialize the first and second re-quantizers, and provide them to the shift registers R1 and R2, respectively;
a register C storing PRN code;
Z correlators, each correlator outputting a correlation of the shift registers R1 and R2 with the register C as the first and second quadratures, respectively, Z being an integer power of 2 and not less than 4,
wherein each correlator uses every corresponding $Z^{th}$ bit in the registers R1, R2 and C for its correlation;
a first set of Z quadrature multipliers that multiply the first and second quadratures by $2^N$, N being non-negative integers individually configurable for each multiplier, a second set of three groups of Z quadrature multipliers that multiply the first and second quadratures by 0 or 1;

each of the Z correlators providing an input to corresponding quadrature multipliers of the first set;

outputs of the multipliers from the first set are provided to corresponding quadrature multipliers in each group in the second set; and a quadrature summer summing inputs from one of the groups, wherein a maximum of outputs of the quadrature summer corresponds to a code shift of a received symbol of a first chip-by-chip multiplexed CSK signal in a Prompt position of the CSK signal.

17. The apparatus of claim 16, wherein (1) the first quadrature or (2) a sum of squares of the first and second quadratures or (3) an amplitude of the first quadrature plus i*second quadrature are checked for the maximum.

18. The apparatus of claim 16, further comprising first and second re-quantizers that reduce a number of bits in the integrated first and second quadratures.

19. The apparatus of claim 16, wherein each of the Z quadrature multipliers are individually configurable to multiply by 0 or 1.

* * * * *